(12) United States Patent
Curlander et al.

(10) Patent No.: US 9,704,044 B1
(45) Date of Patent: *Jul. 11, 2017

(54) ESTIMATING AVAILABLE VOLUMES USING IMAGING DATA

(71) Applicant: Amazon Technologies, Inc., Reno, NV (US)

(72) Inventors: James Christopher Curlander, Mercer Island, WA (US); Jules Cook Graybill, Seattle, WA (US); Udit Madan, Seattle, WA (US); Marshall Friend Tappen, Bainbridge Island, WA (US); Michael Ellsworth Bundy, Seattle, WA (US); David Daniel Glick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,757

(22) Filed: Sep. 19, 2016

Related U.S. Application Data

(63) Continuation of application No. 14/291,187, filed on May 30, 2014, now Pat. No. 9,460,524.

(51) Int. Cl.
| | |
|---|---|
| G06T 7/00 | (2017.01) |
| G06K 9/00 | (2006.01) |
| G01B 11/22 | (2006.01) |
| G01B 11/02 | (2006.01) |
| G06T 7/60 | (2017.01) |
| G06T 7/40 | (2017.01) |
| G06K 7/10 | (2006.01) |
| G06Q 50/28 | (2012.01) |

(52) U.S. Cl.
CPC .......... *G06K 9/00671* (2013.01); *G01B 11/02* (2013.01); *G01B 11/22* (2013.01); *G06K 7/10861* (2013.01); *G06Q 50/28* (2013.01); *G06T 7/408* (2013.01); *G06T 7/602* (2013.01)

(58) Field of Classification Search
None
See application file for complete search history.

(56) References Cited

U.S. PATENT DOCUMENTS

| | | | |
|---|---|---|---|
| 2006/0071786 A1* | 4/2006 | Fano | G08B 25/10 340/539.22 |
| 2008/0025565 A1* | 1/2008 | Zhang | G06K 9/3241 382/103 |

(Continued)

*Primary Examiner* — Delomia L Gilliard
(74) *Attorney, Agent, or Firm* — Athorus, PLLC

(57) ABSTRACT

Imaging data regarding an interior portion of a storage vessel may be obtained from an imaging device (e.g., a digital camera or depth sensor) and interpreted in order to identify an available volume within the storage vessel. Where the imaging data includes an image of an interior of the storage vessel, an area of one or more contiguous spaces of a rear face of the storage vessel may be identified from the image and multiplied by a depth of the storage vessel in order to estimate the available volume. Where the imaging data includes a depth profile of the interior, the depth profile may be processed in order to estimate the available volume. Once an available volume has been estimated, the capacity of the available volume to accommodate one or more additional items may be determined, and information regarding the capacity may be provided to a user.

20 Claims, 13 Drawing Sheets

(56) References Cited

U.S. PATENT DOCUMENTS

| | | | |
|---|---|---|---|
| 2010/0073476 A1* | 3/2010 | Liang | G06Q 10/08 |
| | | | 348/136 |
| 2013/0342653 A1* | 12/2013 | McCloskey | G01S 17/026 |
| | | | 348/46 |
| 2014/0132707 A1* | 5/2014 | Hashimoto | G01C 3/06 |
| | | | 348/36 |

* cited by examiner

ESTIMATE EFFECTIVE AVAILABLE VOLUME =

$$V_{EFF} = (h_{EFF} \cdot w) \cdot d = A_{EFF} \cdot d$$

NET DEPTH MODEL
OF PARTIALLY
FILLED BIN

ESTIMATING AVAILABLE VOLUMES USING IMAGING DATA

CROSS-REFERENCE TO RELATED APPLICATIONS

This application is a continuation of U.S. patent application Ser. No. 14/291,187, filed May 30, 2014, the contents of which are incorporated by reference herein in their entirety.

BACKGROUND

In a fulfillment center environment, items may be received from one or more vendors, merchants, manufacturers or sellers in containers of any size, shape or form. Upon their arrival at a receiving station, items may be removed from their containers and placed in one or more storage vessels or facilities, e.g., bags, bins, boxes, canisters, carts, capsules, crates, envelopes, pods, pallets, trays or tubes, in which the items may remain until an order for one or more of the items is received from a customer. For example, a worker may remove an item from a container upon its arrival at a receiving station and place the item into a bin, a tote or a cart, before transporting the item to a specific region within a storage area.

Once such an order is received from a customer, the items may be transported from their respective storage vessels or facilities to a distribution station, where the items may be prepared for delivery, and shipped to the customer. For example, a worker may be instructed to travel to the specific region within the storage area where the item is located, to retrieve the item therefrom, to place the item in a bin, a tote or a cart, and to transport the item to the destination station. Alternatively, when an order has already been placed for items upon their arrival at a receiving station, the items may be transported directly from the receiving station to a distribution station, or "cross-docked," where the items may be temporarily stored in one or more other storage vessels or facilities prior to being prepared for delivery and shipped to a customer.

Thus, during various processes by which an order for an item is fulfilled on behalf of a customer, the item may be stored in one or more vessels or facilities from a time when the item arrives at a fulfillment center until a time when the item departs from the fulfillment center to an ultimate destination. Such vessels or facilities may be of any size or shape, e.g., rectangular hollows, and formed of any type of materials, such as plastic, wood, metal, canvas or the like. Additionally, such vessels or facilities may be fixed in position, e.g., mounted to walls, floors, ceilings or other structural features, or mobile, e.g., mounted to a cart or other wheeled vehicle.

Frequently, information regarding the present or historical operations within a fulfillment center may be determined through images or other imaging data captured from one or more imaging devices (e.g., digital cameras or other like machines) posted throughout the fulfillment center. Such imaging devices may capture information regarding the general handling of items and processing of orders within and throughout the fulfillment center, as well as information regarding the specific contents of one or more storage vessels or facilities within the fulfillment center. For example, one or more digital cameras may be provided to monitor the arrival or departure of one or more shipments of items at the fulfillment center, as well as to determine the identities of the workers who handled the items, and whether or how many items remain in each of the storage vessels or facilities.

DETAILED DESCRIPTION

As is set forth in greater detail below, the present disclosure is directed to systems and methods for estimating the availability of a defined space based at least in part on imaging data that may be obtained from one or more imaging devices. The imaging data may include one or more digital images obtained from a digital camera or other like imaging device, as well as ranging data obtained from a range camera, a depth sensor or another like imaging device. Where the imaging data comprises an image of all or a portion of an interior of the defined space, the imaging data may be evaluated to identify the portions of the image corresponding to a rear face of the defined space, and an estimated available volume of the defined space may be calculated based at least in part on the content of the image and the known dimensions of the defined space. Where the imaging data comprises depth information regarding the interior of the defined space, the imaging data may be evaluated to identify the portions of the defined space occupied by one or more objects, and an estimated available volume of the defined space may be calculated based at least in part on the depth information and the known dimensions of the defined space.

Thus, one or more available volumes of a defined space may be estimated based on imaging data captured from the defined space by one or more imaging devices. The available volumes may be estimated by distinguishing pixels of a digital image of the defined space that are associated with a rear face from pixels of the digital image of the defined space that are associated with objects, or by determining which voxels of a depth profile of the defined space are occupied, and which of the voxels of the depth profile are unoccupied. Once an estimated available volume of the defined space has been calculated, the eligibility of an item to fit within the estimated available volume may be determined based at least in part on one or more dimensions of the item.

Figure 1A:
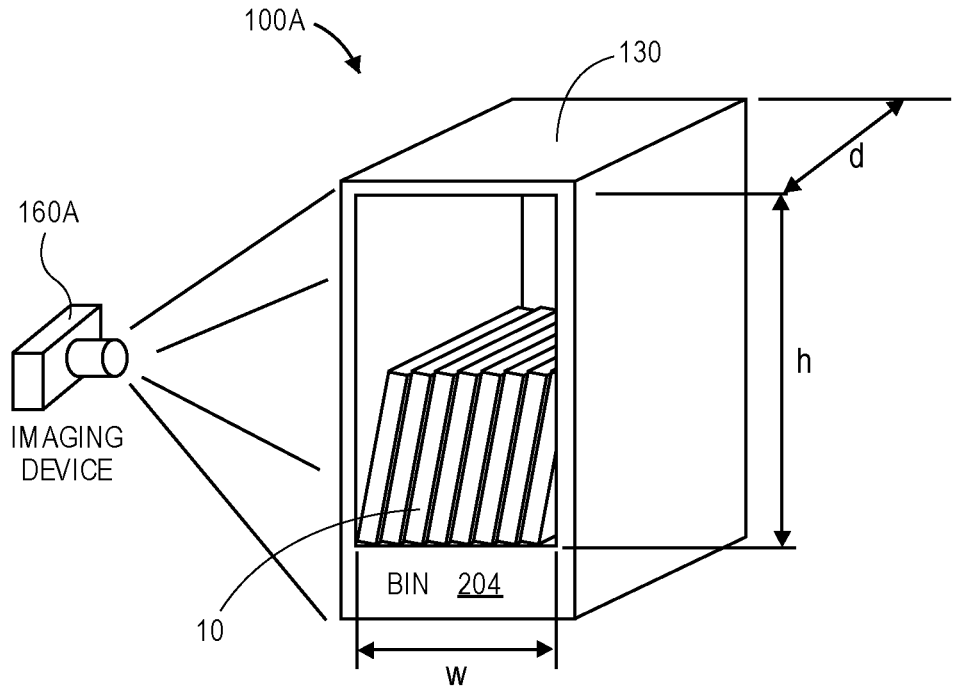
FIGS. 1A and 1B show components of a system for estimating available volumes using imaging data, in accordance with embodiments of the present disclosure.
Figure 1A:
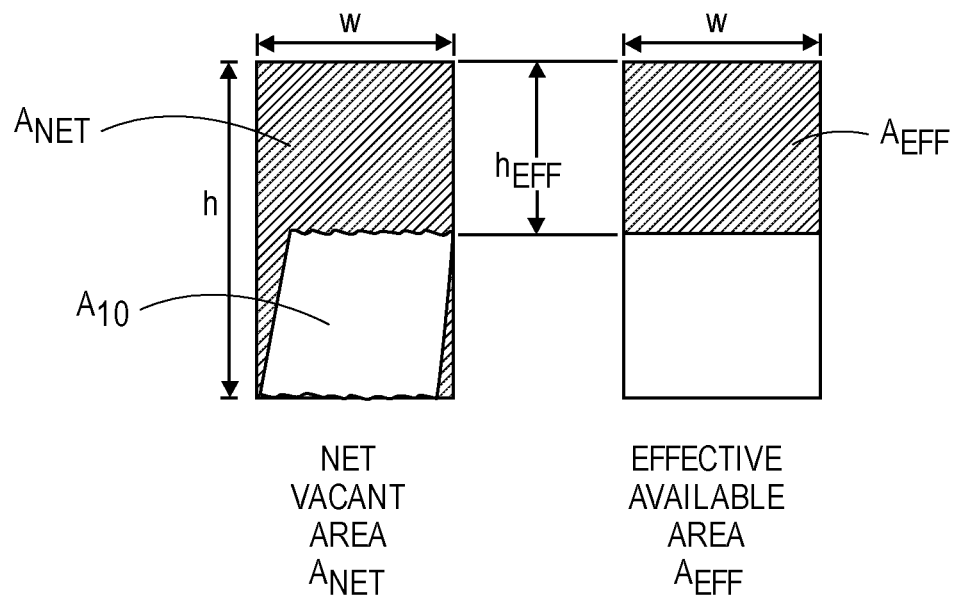
Figure 1B:
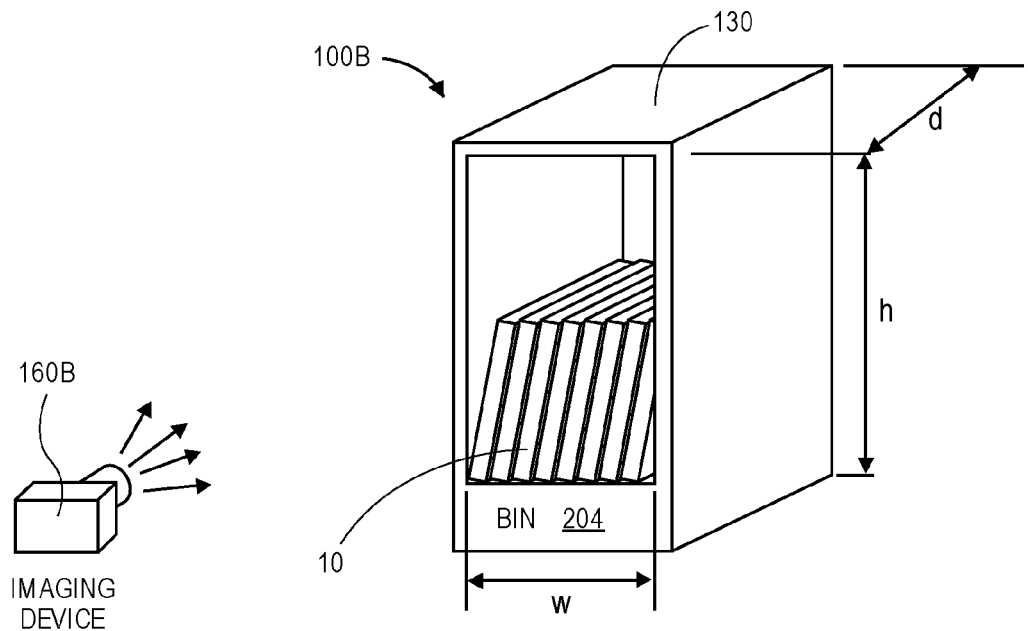
Figure 1B:
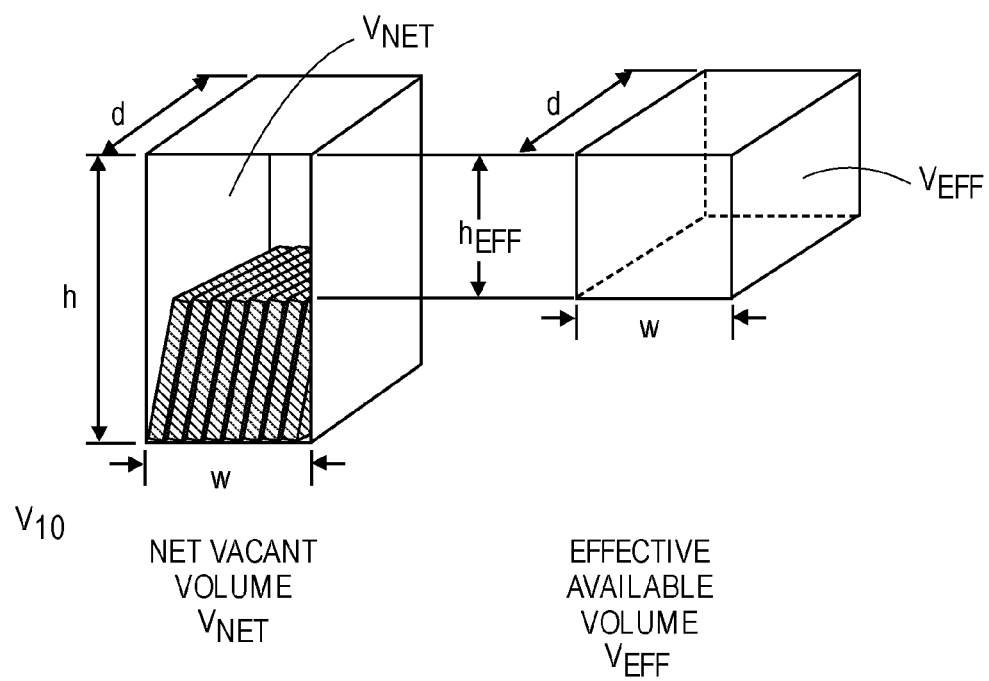

Referring to FIGS. 1A and 1B, systems 100A, 100B for estimating available volumes using imaging data in accordance with embodiments of the present disclosure are shown. As is shown in FIG. 1A, the system 100A includes a storage facility 130 (e.g., bin 204) and an imaging device 160A (e.g., a digital camera) configured to capture one or more images of the storage facility 130 and any items 10 therein. The storage facility 130 has a plurality of predetermined dimensions including a width w, a depth d and a height h.

In accordance with the present disclosure, an estimated available volume of a defined space, such as the storage facility 130 of FIG. 1A, may be determined by identifying a portion of an image of an interior of the defined space which corresponds to a rear face of the defined space, and determining an area of the rear face that is visible in the image. Subsequently, the available volume of the defined space may be estimated by multiplying the area by a depth of the defined space. Referring again to FIG. 1A, a net vacant area $A_{NET}$ of the rear face is derived as a difference between the area of the rear face of the storage facility 130, e.g., a product of the width w and the height h of the storage facility 130, and the area of the items 10 therein, viz., $A_{10}$. Alternatively, the net vacant area $A_{NET}$ may be calculated by identifying each of the pixels or voxels of the image which correspond to the rear face of the storage facility 130, determining a size of each of the pixels or voxels, and determining a net area of the image corresponding to such pixels or voxels. Once a size of the net vacant area $A_{NET}$ is determined, a net vacant volume $V_{NET}$ of the storage facility 130 may be calculated by multiplying the net vacant area $A_{NET}$ of the rear face by the depth d of the storage facility 130. Subsequently, one or more items having dimensions that may be accommodated within the effective available volume $V_{EFF}$ (e.g., a height less than the effective height $h_{EFF}$, a depth less than the depth d, a width less than the width w and an overall volume less than the effective available volume $V_{EFF}$) may be identified and assigned to the storage facility 130 for storage for any duration.

The net vacant area $A_{NET}$ of the rear face may comprise one or more contiguous spaces, such that the net vacant volume $V_{NET}$ of the storage facility 130 comprises a plurality of individual volumes, each of which may be individually assigned to the storage facility 130 for storage of one or more items for any duration. For example, because the net vacant area $A_{NET}$ of the rear face includes portions to the left and the right of the items 10 therein, items may be assigned for storage in the storage facility 130 in the larger portion of the net vacant area $A_{NET}$ of the rear face above and to the left of the items 10, as well as in the smaller portion of the net vacant area $A_{NET}$ of the rear face below and to the right of the items 10.

Alternatively, the accuracy or relevance of an estimated available volume determined based on the portions of an image corresponding to a rear face thereof may be enhanced by processing the image to remove portions of the rear face which correspond to inaccessible regions of the defined space, e.g., arbitrarily placed gaps or voids that are formed between items within the defined space, from consideration. Referring again to FIG. 1A, an effective available area $A_{EFF}$ of the storage facility 130 is calculated by multiplying an effective available height $h_{EFF}$ of the storage facility 130, viz., an approximate available height above the items 10, by the width w of the storage facility 130. Thus, an effective available volume $V_{EFF}$ of the storage facility may be estimated by multiplying the effective available area $A_{EFF}$ of the storage facility 130, corresponding to the effective available height $h_{EFF}$ and width w of the storage facility 130, by the depth d of the storage facility 130.

As is shown in FIG. 1B, the system 100B includes the storage facility 130 of the system 100A of FIG. 1A and an imaging device 160B (e.g., a range camera or depth sensor) configured to capture imaging data in a form of a depth profile of the storage facility 130 and any items 10 therein. Using the depth profile, a net vacant volume $V_{NET}$ of the storage facility 130 may be determined based on a difference between the depth profile and a known volume of the storage facility 130. As is shown in FIG. 1B, the net vacant volume $V_{NET}$ of the storage facility 130 is calculated by subtracting the volume $V_{10}$ of the items within the storage facility 130 from the volume of the storage facility defined by the width w, the depth d and the height h.

Additionally, an effective available volume of a storage facility may be estimated by removing portions of a net vacant volume of the storage facility that correspond to regions that may not be easily accessed, or may not be filled by one or more additional items. Referring again to FIG. 1B, an effective available volume $V_{EFF}$ of the storage facility 130 may be determined as including the accessible portions of the storage facility 130 that may be accessed and/or occupied by additional items, e.g., the portion of the net vacant volume $V_{NET}$, corresponding to a maximum effective height $h_{EFF}$ above the items 10 within the storage facility 130. One or more items having dimensions that may be accommodated within the effective available volume $V_{EFF}$ may be identified thereafter and assigned to the storage facility 130 for storage.

Accordingly, as is set forth in greater detail below, the systems and methods of the present disclosure may be directed to estimating available volumes of defined spaces such as the storage facility 130 of FIGS. 1A and 1B, identifying items that may be accommodated within such available volumes and assigning such items to the defined spaces for storage. For example, the available volumes within various defined spaces throughout a fulfillment center or another like environment may be estimated using imaging devices that are worn or carried by a worker during the performance of any task within the fulfillment center or like environment, e.g., on a wearable computer device such as augmented reality glasses or like machines that are configured to passively capture imaging data regarding such defined spaces.

In this regard, imaging data regarding the defined spaces may be captured using one or more of the imaging devices and processed to locate and identify any available volumes therein, and information regarding such available volumes may be stored in one or more records maintained in at least one data store. Subsequently, when a specific item is identified as requiring storage within the fulfillment center, the information regarding the available volumes may be evaluated in order to determine which of the available volumes may accommodate the specific item, and instructions identifying a location of the available volume within the fulfillment center may be provided to one or more workers. Information regarding the suitability of one or more defined spaces for accommodating an item may be presented to the workers in any manner, such as on one or more computer displays, including but not limited to computer displays provided on wearable computer devices.

Fulfillment centers that are operated or maintained on behalf of an electronic marketplace may be configured to receive items from one or more vendors (or merchants, manufacturers or sellers) of such items, and to handle and store the items until the items are to be delivered to another destination, such as a location specified by a customer who orders one or more of the items, or another fulfillment center where a demand for one or more of the items may exist. During processes by which items are received from vendors and handled or stored, as well as processes by which such items are prepared for delivery to customers or other destinations, the items may be placed in one or more storage vessels or facilities of any shape or form. Such storage vessels or facilities may include any number of fixed or mobile bags, bins, boxes, canisters, carts, capsules, crates, envelopes, pods, pallets, trays or tubes which may be located at a receiving station (e.g., temporary storage vessels or facilities provided for the purpose of receiving and consolidating items), a storage area or a distribution station (e.g., temporary storage vessels or facilities provided to workers packing and preparing items for delivery). The assignment of items to specific storage vessels or facilities, as well as records of the storage vessels or facilities into which such items are deposited, may be implemented and controlled using one or more computer-based systems.

For example, when an item arrives at a fulfillment center, and the item is placed into storage by a first worker, an electronic record associating the item with a location of a storage vessel or facility into which the item is deposited may be generated and stored in an index maintained in a data store. When an order for the item is received, the index may be consulted in order to determine the location of the item, and one or more instructions identifying the item and the location may be provided to a second worker, who may retrieve the item from the location and transport the item to a distribution station where the item may be prepared for delivery and shipped to a customer. Thus, the efficiency of operations at a fulfillment center may be greatly enhanced where the amount and extent of available storage space at the fulfillment center may be easily and accurately determined.

Currently, many fulfillment centers utilize networks comprising one or more imaging devices that are provided in order to monitor ongoing operations and security within the fulfillment centers. For example, a fulfillment center may include any array of digital cameras or other imaging devices that are provided at fixed locations, e.g., along beams, girders or other elements of a ceiling, as well as various shelving units disposed throughout the fulfillment center, or on one or more mobile structures or units, e.g., carts or other vehicles. Typically, such imaging devices are provided to capture images associated with the receipt, handling and storage of various items, such as instances in which such items are transported or otherwise manipulated by workers, as well as instances in which such items are misplaced, dropped or damaged within the fulfillment center. Some such imaging devices may capture images of the contents of a storage vessel or facility at various times, in order to determine whether or when specific items are deposited within the storage vessel or facility, or whether or when such items are retrieved from the storage vessel or facility.

However, such imaging devices are not configured to capture imaging data for the purpose of determining whether a storage vessel or facility has any available space or volume therein, or the extent of the available space of volume within the storage vessel or facility. Additionally, imaging data obtained by such imaging devices is not presently utilized in order to identify items that may be accommodated within a given storage vessel or facility.

The systems and methods of the present disclosure are directed to capturing imaging data regarding the contents of a bin or other storage vessel or facility (e.g., a bag, a bin, a box, a canister, a cart, a capsule, a crate, an envelope, a pod, a pallet, a tray or a tube, or any other like vessel or facility), and estimating an available volume, or one or more available volumes, within the bin based at least in part on the imaging data, as well as any known information or data regarding the dimensions of the bin. For example, where the imaging data includes one or more digital images of the interior portions of a bin, the imaging data may be processed in order to distinguish pixels of the digital images which correspond to a rear face of the bin from pixels of the digital images that correspond to objects or obstructions within the bin. Where the imaging data includes a depth profile of the interior portions of the bin, the imaging data may be processed in order to distinguish voxels of the depth profile that are occupied from voxels of the depth profile that are not occupied.

The estimated available volume of a bin or other storage vessel or facility may be determined in any number of ways. For example, a size of a visible portion of imaging data corresponding to a rear face of the bin may be calculated and multiplied by a depth of the bin in order to determine an approximate available volume of the bin, such as is discussed above with regard to FIG. 1A. The visible portion of the rear face may include one or more segments or sub-parts, and the size of the visible portion of the rear face may be determined by an analysis of the image with regard to known dimensions of the rear face (e.g., a height and width), or by counting a number of pixels corresponding to the rear face, and determining a size of each of the pixels through a transformation or like analysis. According to some embodiments of the present disclosure, the rear face of the bin may be provided in a different color than the other portions of the bin, which may cause the rear face of the bin to stand out within the image. According to still other embodiments, the rear face of the bin may be provided in a distinct or noteworthy color, as compared to the colors of the items in the bin, which may also cause the rear face of the bin to stand out within the image.

Those of ordinary skill in the pertinent arts further recognize that information and/or data regarding features or objects expressed in a digital image, including colors, textures or outlines of the objects within a bin, may be extracted from the digital image in any number of ways, such as by using any form of photogrammetric or colorimetric analyses. For example, colors of pixels or voxels, or of groups of pixels or voxels, expressed in a digital photograph or other imaging data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Textures or features of objects expressed in a digital photograph may be identified using one or more computer-based methods, such as by identifying changes in intensities within regions or sectors of the photograph, or by defining areas of a photograph corresponding to specific surfaces. Furthermore, outlines of objects expressed in a digital photograph may be identified using one or more algorithms or machine-learning tools. Some such algorithms or tools may recognize edges, contours or outlines of objects in a digital photograph, or of portions of objects in the digital photograph, and may match the edges, contours or outlines of the objects against information regarding edges, contours or outlines of known objects, which may be stored in one or more data stores.

The selection of a particularly distinct or noteworthy color for the rear face of the bin, as compared to the colors of the items in the bin, may cause the rear face of the bin to stand out within the image. According to some embodiments of the present disclosure, the color of the rear face may be selected according to one or more algorithms that may ensure, or at least minimize the risk, that the rear face does not echo or blend into the contents of the bin. For example, where a rear face is provided in a color such as hot pink, viz., a color having red, green and blue pixel values of 240, 160, 150 according to the RGB color model, the rear face may stand out from objects that are not hot pink in color, but the ability to identify, and the effectiveness of identifying, the rear face of a hot pink bin from imaging data captured of the bin may be limited where the objects within the bin are also hot pink in color, e.g., a sweater, which may be confusingly determined to include available space.

Therefore, according to some embodiments of the present disclosure, a color of a rear face of a bin or other storage facility may be selected based on an analysis of a large sample of images of bins or other storage facilities, which may be captured and provided as a training set, and from which a three-dimensional color histogram may be generated based on aggregate color information derived from all of the images. For example, a modified distance transformation may then be applied to the histogram, such that the scores associated with each of the voxels is a weighted combination Euclidean distance from each histogram voxel as well as the histogram value of that voxel. The transformed histogram thus includes maxima that are farthest from the densest parts of the color histogram, and thereby correspond to colors that appear least often in the images of bins or other training facilities in the training set.

Alternatively, the algorithms for identifying such colors may be modified in order to identify a sphere of sufficient radius falling around a maximum of the transformed histogram. The sphere thus represents a size of color quantization that may be applied to the selected color. The information regarding the size of the color quantization that may be applied to the selected color is required in order to extract a rear face of a bin from an image if the image has been color quantized, e.g., in the case of image compression. For example, if the color of hot pink is selected for a rear face of a bin, when a color-quantized image of the bin is created, the actual background color in the color-quantized image may be different than hot pink, but should fall within the sphere around the target color, and thus be sufficiently distinct or noteworthy in order to be distinguished from items expressed within the image.

In addition to the RGB color model, there are other three-dimensional spaces that may be considered, including but not limited to hue-saturation-value (or HSV) and hue-saturation-lightness (or HSL). The algorithms for identifying such colors may work equally well in any three-dimensional space, although one or more specific spaces may be selected for a spherical estimation, based at least in part on the type of color compression that is utilized.

Additionally, an available volume within a bin may be estimated using imaging data captured from a range camera or depth sensor aligned substantially perpendicular or normal to the interior of the bin. The imaging data may comprise information regarding a depth or range profile of the interior of the bin with the contents therein, and an estimated available volume may be derived by subtracting the depth or range profile of the interior of the bin with the contents therein from a known depth or range profile of the bin when empty, such as is discussed above with regard to FIG. 1B.

Depth data or ranging data, e.g., distances or depths to an object or the various interior surfaces of a bin, may be captured from a depth sensor, a range camera or another like imaging device. For example, such devices may include infrared projectors for projecting infrared light onto one or more surfaces of objects within a bin, or the bin itself, and infrared sensors including arrays of pixel detectors for capturing digital imaging data regarding the wavelengths of the reflected light within different spectral bands, such as relatively lower frequency bands associated with infrared light, which may be projected upon an object or a bin in order to determine information regarding a distance to the object or the bin from which such light is reflected, or an orientation or configuration of the object or the bin. For example, the reflected light within the infrared bands may be processed in order to recognize a distance to the object or surfaces within an interior of the bin, as well as one or more dimensions (e.g., heights, widths or lengths) of the objects or the surfaces within the interior of the bin.

Moreover, where an aggregate volume defined by an estimated area of a rear face of a bin, or a net depth profile of the bin, includes one or more discrete, contiguous volumes, information regarding the dimensions of such volumes, and their respective locations within the bin, may be stored in at least one record, and made available to receive one or more items having dimensions that may be accommodated therein. Subsequently, one or more items may be assigned for storage within the designated volumes. Alternatively, the estimated areas or volumes may be further processed or refined in order to account for the inaccessibility of one or more elements of such areas or volumes or any other factor, and to identify a net vacant area or an effective available volume thereby. For example, referring again to the storage facility 130 of FIGS. 1A and 1B, the portions of the storage facility 130 to the immediate left and right, respectively, of the items 10 may not be readily accessed by a worker and cannot accommodate many items. Therefore, the net vacant area or the effective available volume may be defined based at least in part on the portion of the bin above the maximum height of the items 10, and the net vacant area or the effective available volume may be used to identify one or more additional items that may be readily accommodated in the storage facility 130.

Those of ordinary skill in the pertinent arts would further recognize that an imaging device for capturing images of objects and interior surfaces of a bin, e.g., a digital camera, and an imaging device for capturing ranging or depth information regarding the objects and the interior surfaces of a bin, e.g., a depth sensor or range camera, may be combined into a single imaging device or sensor. For example, one such device is an RGB-Z sensor, which may capture not only color-based imaging information regarding an object (e.g., colors of pixels in an image of the object, expressed according to the RGB color model) but also information regarding distances from the object (e.g., a depth or a range z to the object). Moreover, those of ordinary skill in the pertinent arts would recognize that the imaging data may be captured using imaging devices that are dedicated to this purpose, as well as any other type or form of imaging device, including imaging devices that are fixed in position as well as imaging devices that are mobile in nature.

Once one or more estimated available volumes of a bin or other storage vessel or facility have been identified, and the dimensions of such volumes have been determined, the dimensions of the volumes may be compared to one or more dimensions of an object in order to determine whether the bin is suitable for the object, e.g., whether the object may be accommodated in the bin. Moreover, the systems and methods of the present disclosure may be provided for the purpose of estimating the available volumes of multiple spaces provided in one or more confined locations, e.g., bins, and selecting one or more items to be accommodated within the volumes of such confined locations, or selecting a confined location into which an item may be stored, based on a comparison of the estimated available volumes of the confined locations to one or more dimensions of the object.

According to some embodiments of the present disclosure, the estimated available volumes of a bin or another confined location may be compared to the volume of the object. Alternatively, the various dimensions associated with such volumes may be determined based on imaging data, and compared to the various dimensions of an object (e.g., a width, a depth and a height of the object may be compared to a width, a depth and a height of the bin). After the dimensions of the bin are compared to the dimensions of the object, information or data regarding the suitability of the bin for the object may be provided to a user of one or more computer systems, such as by overlaying the information within a display or window rendered by a computer device, e.g., a pair of augmented reality glasses or other like wearable computer system.

Those of ordinary skill in the pertinent arts will recognize that the systems and methods of the present disclosure may be utilized to estimate an available volume of any type or form of defined space, and are not limited for use with regard to bins or other like storage vessels or facilities. For example, the systems and methods disclosed herein may be used to determine the available volumes within a refrigerated facility or on a library shelf, or in any other structure configured to accommodate items. Moreover, imaging data may be obtained from any type or form of imaging device, which may be fixed or mobile, e.g., mounted to or otherwise associated with a cart. The imaging data may be captured and processed in real time or in near-real time, and in one or more online or offline processes, either singly or as a part of a batch of such processes.

Figure 2A:
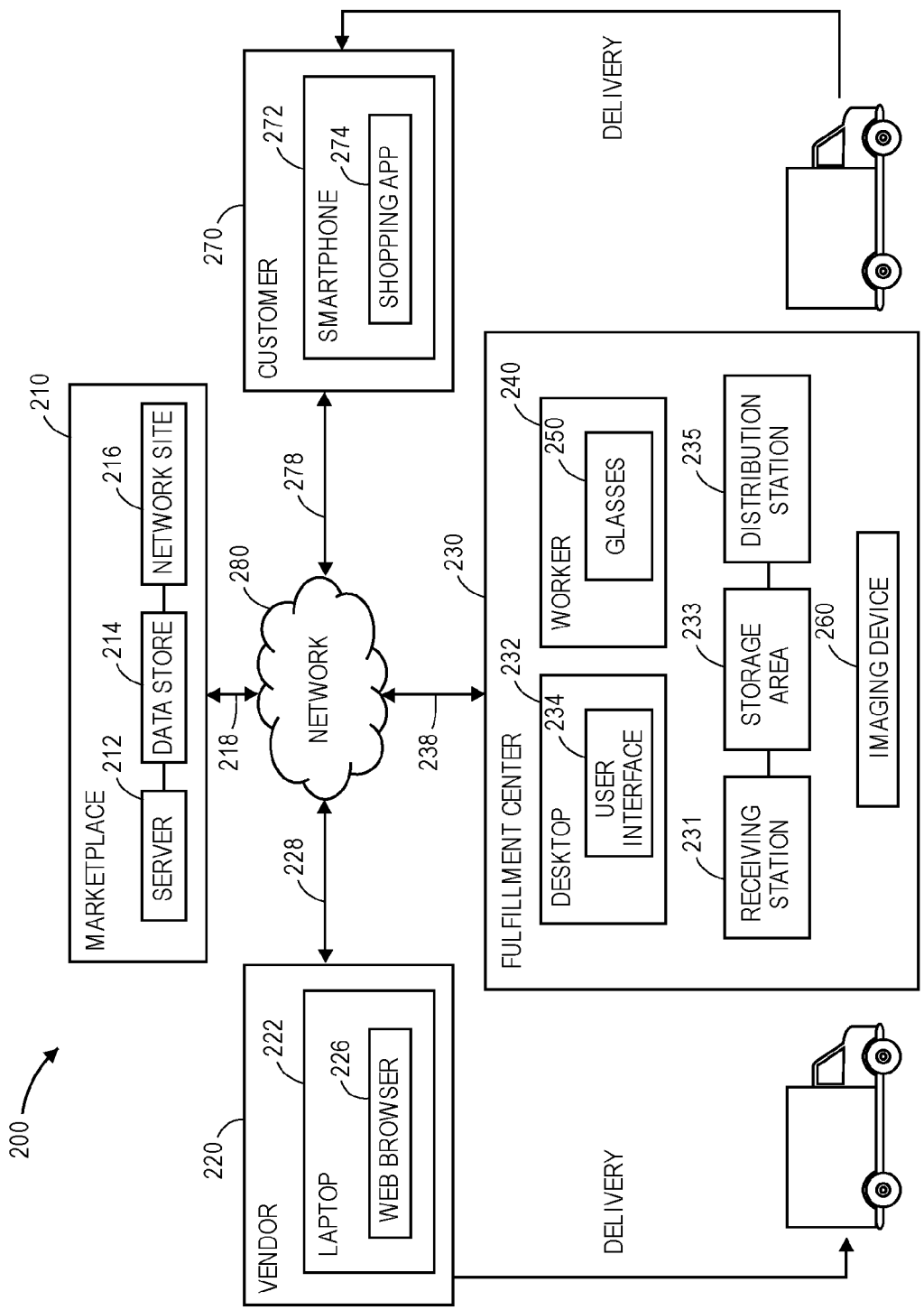
FIGS. 2A and 2B are block diagrams of components of systems for estimating available volumes using imaging data, in accordance with embodiments of the present disclosure.
Figure 2B:
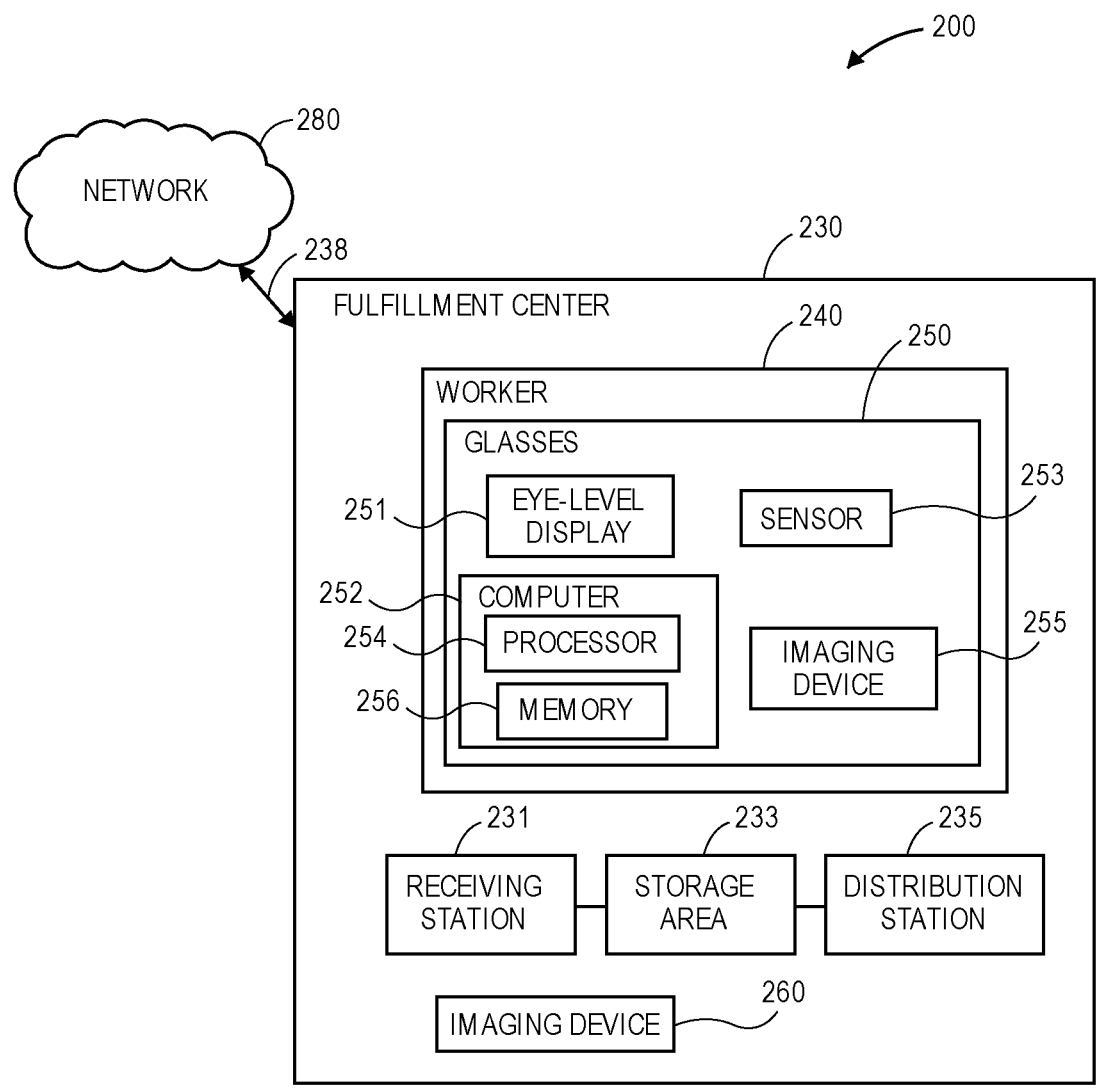

Referring to FIGS. 2A and 2B, a block diagram of one system 200 for estimating available volumes using imaging data is shown. The system 200 includes a marketplace 210, a vendor 220, a fulfillment center 230 and a customer 270 that are connected to one another across a network 280, such as the Internet. The system 200 further includes a worker 240 who is associated with the fulfillment center 230 and is wearing a pair of augmented reality glasses 250.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2A, the fulfillment center 230 includes a desktop computer 232, as well as stations for receiving, storing and distributing items to customers, including but not limited to a receiving station 231, a storage area 233 and a distribution station 235. The fulfillment center 230 further includes a worker 240 and an imaging device 260. As is also shown in FIG. 2A, the worker 240 is wearing or operating a wearable computer device such as a pair of augmented reality glasses 250.

The fulfillment center 230 may operate one or more order processing and/or communication systems using a computing device such as the desktop computer 232 and/or software applications having one or more user interfaces 234 (e.g., a browser), or through one or more other computing devices or machines that may be connected to the network 280, as is indicated by line 238, in order to transmit or receive information in the form of digital or analog data, or for any other purpose. The computer 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The computer 232 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235, as well as for the glasses 250 or the imaging device 260. Such control systems may be associated with the computer 232 or with one or more other computing devices or machines, and may communicate with the worker 240, the glasses 250 or the imaging device 260 within the fulfillment center 230 by any known wired or wireless means, or with the marketplace 210, the vendor 220 or the customer 270 over the network 280, as indicated by line 238, through the sending and receiving of digital data.

Additionally, the fulfillment center 230 may include one or more systems or devices (not shown in FIG. 2A) for determining a location of one or more elements therein, such as cameras or other image recording devices. Furthermore, the fulfillment center 230 may also include one or more workers or staff members, including but not limited to the worker 240, who may handle or transport items within the fulfillment center 230. Such workers may operate one or more computing devices or machines for registering the receipt, retrieval, transportation or storage of items within the fulfillment center, such as the computer 232, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

As is shown in FIG. 2A, the worker 240 may handle or transport items within the fulfillment center 230, such as by removing the items from a car, truck, ship or aircraft, placing the items onto a crane, jack, belt or another conveying apparatus at the receiving station 231, transporting the items to a shelf, bin, rack, tier, bar, hook or other storage means within the storage area 233, retrieving the items from such a storage means within the storage area 233, transporting the items to a defined region within the distribution station 235, and preparing the items for delivery to one or more customers. According to one embodiment, the worker 240 may also transport, or "cross-dock," items directly from the receiving station 231 to the distribution station 235.

Moreover, the worker 240 may operate one or more computing devices for registering the receipt, retrieval, transportation or storage of items within the fulfillment center, such as the glasses 250 or another computer device (e.g., a handheld device) which may be a device that is specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices. The worker 240 may confirm his or her retrieval of an item, such as by using the one or more computers or other handheld devices, at any time, including when the worker 240 has obtained the item from a shelf or other storage means within the storage area 233 and placed the item into one or more containers for transportation to the distribution station 235, or when the worker 240 has retrieved the item from the one or more containers at the distribution station 235.

The imaging device 260 may include or comprise any form of optical recording device (e.g., a digital camera, a range camera or depth sensor) that may be used to photograph or otherwise record imaging data regarding any form of objects, as well as any form of bin or other storage vessel or facility, or perform any other function. The imaging device 260 may capture one or more still or moving images, as well as any relevant audio signals or other information. For example, the imaging device 260 may be configured to capture images of objects that are still or in motion, or in any other manner, and the imaging device 260 may be fixed or mobile. The imaging device 260 may also include one or more actuators, shutters and/or data stores, and may be adapted or otherwise configured to communicate with or to access one or more other computer devices by way of the network 280. Although the system 200 of FIG. 2A and FIG. 2B includes a single imaging device 260, any number or type of imaging devices may be provided in accordance with the present disclosure, including but not limited to digital cameras, range cameras, depth sensors or other optical sensors.

The customer 270 may be any entity or individual that wishes to download, purchase, rent, lease, borrow or otherwise obtain items (which may include goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or items from facilities maintained by or on behalf of the marketplace 210, such as the fulfillment center 230, or from the vendor 220.

As is shown in FIG. 2B, the worker 240 may wear or otherwise manipulate a wearable computer system, such as a pair of augmented reality glasses 250 including an eye-level display 251, a computer device 252, a sensor 253 and an imaging device 255. The computing device 252 includes a processor 254 and a memory 256, and may be in communication with the marketplace 210, the vendor 220 or other external components via the network 280, through the sending and receiving of digital data. The memory 256 may contain computer program instructions that the processor 254 may execute in order to implement one or more embodiments of the present disclosure, and may further include random access memory ("RAM"), read-only memory ("ROM") or any other form of persistent and/or non-transitory computer-readable media. The memory 256 may further store an operating system thereon, for the purpose of providing general administration and operation functions for the processor 254 and other components of the glasses 240, as well as other information for implementing any aspects of the present disclosure.

The eye-level display 251 may include any type or form of output device that may be positioned at or near an eye-level of the worker 240 wearing the glasses 250. The eye-level display 251 may thus include a substantially transparent display device that may be mounted or visible within a field of view of the worker 240, including but not limited to a sufficiently small monitor or a head-up display projected upon or by a lens or other optical element of the glasses 250, and may therefore project information within the field of view of the worker 240. For example, the eye-level display 251 may incorporate any of a number of active or passive display technologies, such as electronic ink, liquid crystal display (or "LCD"), LED or organic light-emitting diode (or "OLED") displays, cathode ray tubes (or "CRT"), projection screens or the like. Those of ordinary skill in the pertinent art would further realize that any other form of output device may be associated with the eye-level display 251, or may act as a substitute for the eye-level display 251.

The sensor 253 may be any form of sensing device for detecting conditions in an environment within the fulfillment center 230, and may be operatively or functionally joined with the computer 252 and one or more other components by any wired or wireless means. For example, the sensor 253 may be configured to read or interpret one or more external markings on an object, as well as to determine a distance from between the sensor 253 and the object. Some such external markings may include images, bar codes, QR codes, bokodes, characters, numbers, symbols, or colors that are located within a specific distance or depth of field of the sensor 253. Those of ordinary skill in the pertinent art will recognize that the number or type of sensors that may be provided in accordance with the present disclosure, including but not limited to cameras or other optical sensors, temperature sensors, heat sensors, radiation sensors or position and/or orientation sensors, is not limited. Those of ordinary skill in the pertinent art will also recognize that the sensor 253 may also be or include a camera.

The imaging device 255 may be any form of optical recording device mounted to or otherwise associated with the glasses 250, e.g., a digital camera or a range camera or depth sensor that may be mounted to a frame of the glasses 250. For example, the imaging device 255 may be used to photograph or otherwise capture and record images of the structures, facilities or other elements for storing items inside the fulfillment center 230, as well as the items within the fulfillment center 230, or for any other purpose. Such images may be captured by the imaging device 255 and recorded during the performance of any task while the worker 240 is wearing the glasses 250.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," "glasses" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," "glasses" or a "customer" may be typically performed by a human operator, but could, alternatively, be performed by an automated agent.

The marketplace 210, the vendor 220, the fulfillment center 230, the worker 240, the glasses 250, the imaging device 260 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the glasses 250 or the glasses computer 252 may be adapted to transmit information or data in the form of synchronous or asynchronous messages to the fulfillment center 230 and/or the laptop computer 222, the desktop computer 232, the smartphone 272 or any other computer device in real time or in near-real time, or in one or more offline processes, via the network 280. Those of ordinary skill in the pertinent art would recognize that the marketplace 210, the vendor 220, the fulfillment center 230, the worker 240 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the desktop computer 232, the glasses computer 252, the imaging device 260 or the customer computer 272, or any other computers or control systems utilized by the marketplace 210, the vendor 220, the fulfillment center 230, the worker 240 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
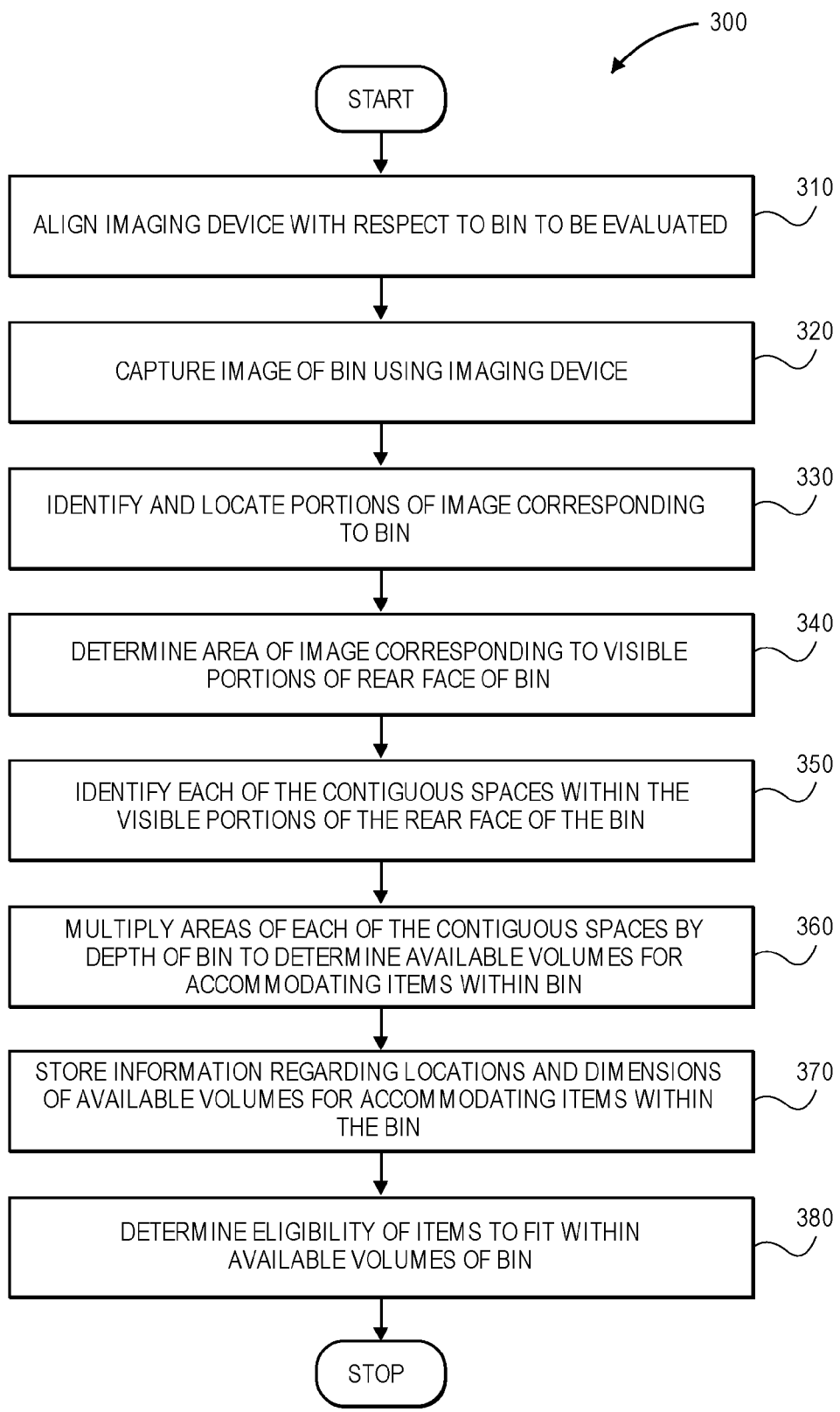
FIG. 3 is a flow chart of a method for estimating available volumes using imaging data, in accordance with embodiments of the present disclosure.

As is discussed above, the systems and methods of the present disclosure are directed to estimating available volumes within a bin or other storage vessel or facility using imaging data. Referring to FIG. 3, a flow chart 300 representing one embodiment of a process for estimating available volumes is shown. At box 310, an imaging device is aligned with respect to a bin to be evaluated, and at box 320, an image of the bin is captured using the imaging device. For example, referring again to FIG. 1A, a digital camera or like imaging device 160 may be aligned substantially perpendicular or normal to an interior of the bin, and an image of the interior is captured.

At box 330, the portions of the image captured at box 320 corresponding to the bin are identified and located. For example, the various pixels or voxels included in the image may be evaluated in order to determine which of said pixels or voxels corresponds to the bin.

At box 340, an area of the image corresponding to the visible portions of the rear face of the bin is determined. The area of the image corresponding to such visible portions may be identified by any known means or method, such as by identifying the regions or sectors of the image that correspond to items within the bin, or by identifying the regions or sectors of the image that correspond to the bin itself, and determining dimensions of such regions or sectors based on the known dimensions of the items or of the rear face of the bin. For example, where a bin is six inches wide and twelve inches tall, an image of an interior of the bin that shows approximately two-thirds of the rear face of the bin may be understood to have a net vacant area of forty-eight inches (or 48 sq. in.). Alternatively, a number of pixels corresponding to the visible portions of the rear face of the bin may be determined, such as by counting, and a size of each of the pixels may be geometrically determined according to one or more transformation processes. According to some embodiments of the present disclosure, the rear face of the bin may be provided in a different color than the other portions of the bin, or in a distinct or noteworthy color, e.g., blaze orange or lime green, as compared to the colors of the items in the bin, in order to cause the rear face of the bin to stand out within the image.

At box 350, each of the contiguous spaces within the visible portions of the rear face of the bin is identified, and at box 360, the areas of each of the contiguous spaces are multiplied by depth of the bin. For example, referring again to the storage facility 130 of FIGS. 1A and 1B, the portions of the storage facility 130 to the lower right and upper left of the items 10, respectively, are contiguous spaces, and the areas of such spaces may be multiplied by the depth d of the storage facility 130 in order to determine their respective volumes. Alternatively, contiguous spaces of the visible portions of the rear face that are of an insignificant size or have areas below a predetermined threshold, e.g., the narrow areas to the right and the left of the items 10 in the storage facility 130, may be disregarded for the purpose of estimating an effective available volume of the storage facility 130. In this regard, an effective available volume of the storage facility 130 may be determined as a product of an effective area $A_{EFF}$ and a depth d of the storage facility 130. For example, where approximately ten square inches (10 sq. in.) of a rear face of a bin is visible in an image thereof, and the bin has a depth of twelve inches, an effective available volume of the bin is approximately one hundred twenty cubic inches (120 cu. in.).

At box 370, information regarding the locations and the dimensions of the various available volumes for accommodating the items within the bin is stored in at least one data store. For example, a record may be generated regarding the net capacity of the bin to accommodate one or more additional items, and the record may be stored along with a location of the bin in at least one data store along with records or other information regarding the net capacities and locations of one or more other bins.

At box 380, the eligibility of individual items to fit within the available volumes of the bin is determined, and the process ends. For example, where a bin has an available volume of approximately one hundred twenty cubic inches (120 cu. in.), an item, or a combination of items, having an aggregate volume of not more than one hundred twenty cubic inches may be assigned for storage in the bin. Alternatively, and in addition to the volume, other dimensions of the bin may be compared to other dimensions of the item in order to determine whether the item is eligible to fit within the effective available volume of the bin. A width, a depth and a height of an item may be compared to a width, a depth and a height of the available portions of the bin. Information regarding the eligibility of one or more items to be fit within the bin may be provided to a user in any manner, such as on one or more computer displays, e.g., an eye-level display of a wearable computer system or device.

Figure 4A:
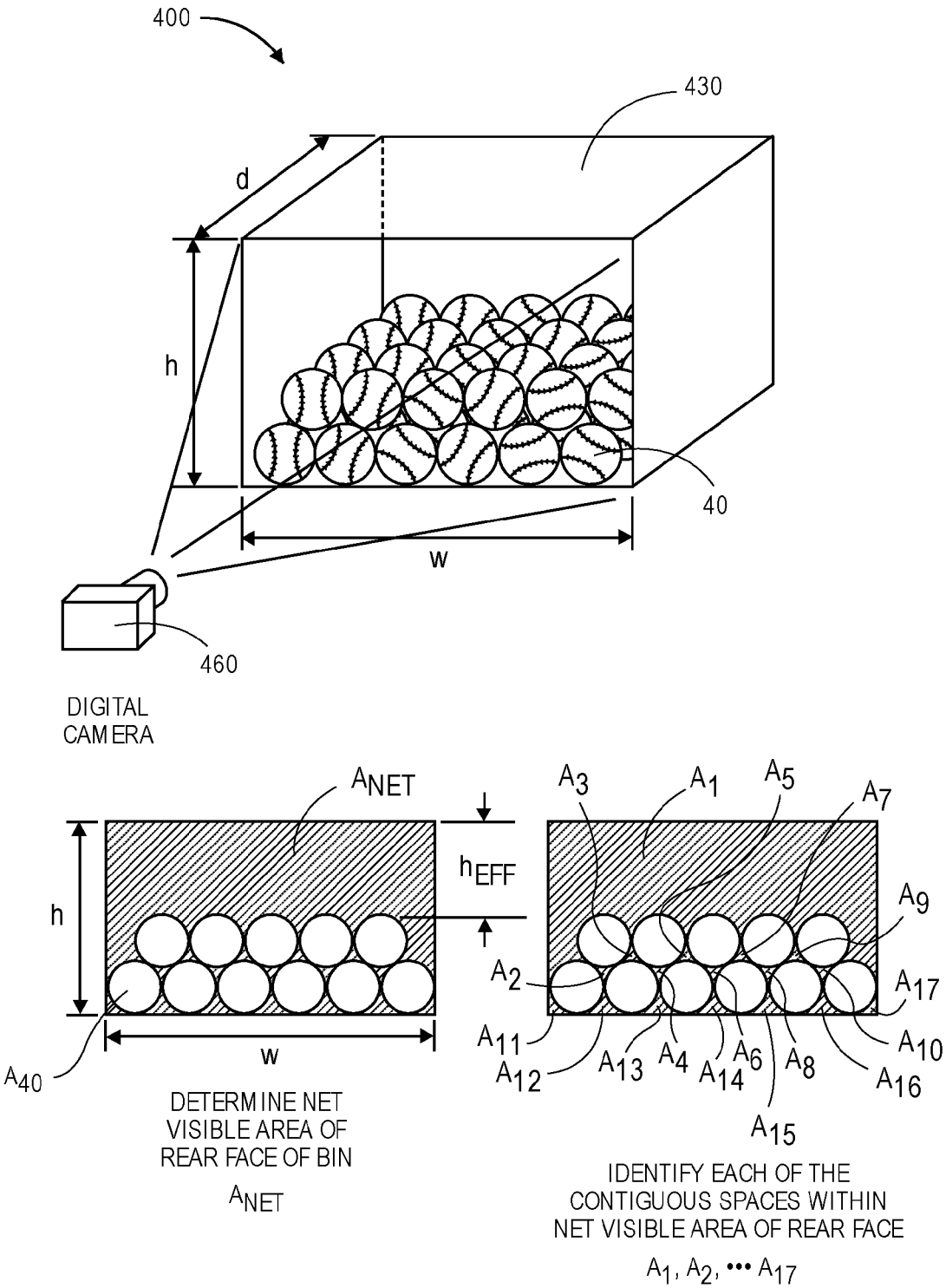
FIGS. 4A and 4B show components of systems for estimating available volumes using imaging data, in accordance with embodiments of the present disclosure.
Figure 4B:
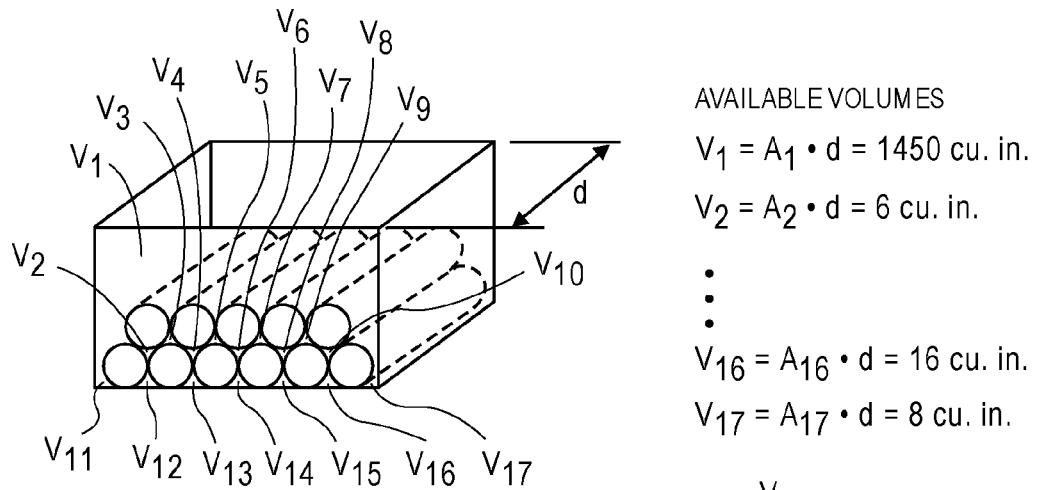
Figure 4B:
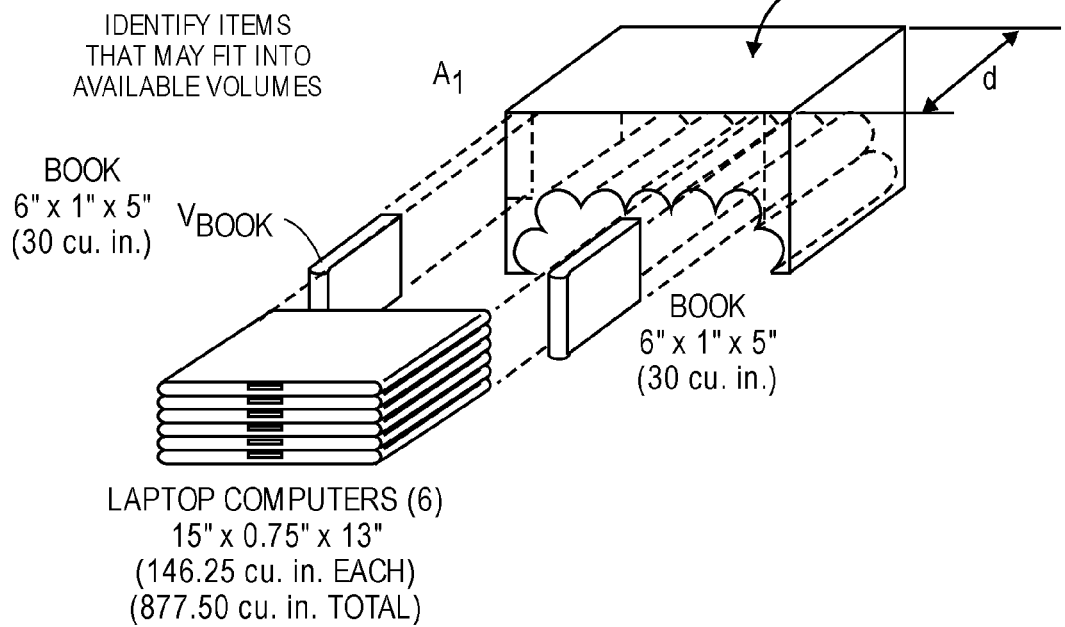
Figure 4B:
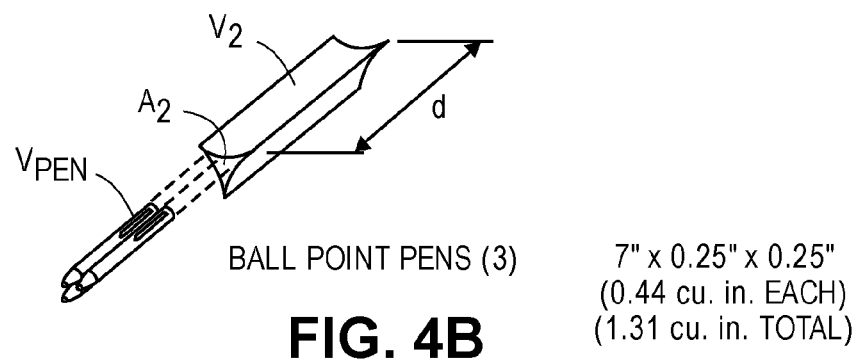

Therefore, by estimating the dimensions of one or more available volumes of a bin based on imaging data regarding the visible portions of the bin, and comparing dimensions of the estimated available volumes of the bin to dimensions of one or more items, the eligibility of the items to be accommodated within the various estimated available volumes may be determined. Referring to FIGS. 4A and 4B, components of systems for estimating available volumes using imaging data are shown. Except where otherwise noted, reference numerals preceded by the number "4" in FIG. 4A or FIG. 4B indicate components or features that are similar to components or features having reference numerals preceded by the number "2" shown in FIG. 2A or FIG. 2B, or by the number "1" shown in FIG. 1A or FIG. 1B.

As is shown in FIG. 4A, a system 400 including a bin 430 and a digital camera 460 is shown. The bin 430 has a width w, a height h and a depth d, and contains a plurality of items 40 (viz., baseballs). According to the systems and methods of the present disclosure, an image of an interior of the bin 430 may be captured and evaluated in order to identify portions of the image corresponding to the items 40 and portions of the image corresponding to a net visible area of a rear face of the bin 430. As is also shown in FIG. 4A, the net visible area of the rear face of the bin 430, viz., $A_{NET}$, may be calculated by any means or method. For example, the pixels of the image corresponding to the rear face of the bin 430 may be recognized through a photogrammetric or colorimetric analysis of the image, and by comparing the sizes and shapes of such pixels or groups thereof to the known dimensions of the bin 430. The pixels of the image corresponding to the rear face of the bin 430 may thus be distinguished from the pixels of the image corresponding to items 40 within the bin, e.g., by determining which aspects of the image are in the foreground of the image and which aspects of the image are in the background of the image.

Where the width w of the bin is known, an area of the portions of the image corresponding to the rear face of the bin 430 may be extrapolated based on the distances between the upper boundary of the bin 430 and the upper surfaces of the items 40. Likewise, a number of the pixels of the image corresponding to the rear face of the bin 430 may be determined, e.g., by counting, and a net area of the rear face of the bin 430 may be determined based on the combined area of each of such pixels. Further, the net area of the rear face of the bin 430 may be determined by identifying an area corresponding to each of the items 40, e.g., a cross-sectional area $A40$ of each of the baseballs, and subtracting the area from a product of the height h of the bin 430 and the width w of the bin 430.

Additionally, the various contiguous spaces within the net visible area $A_{NET}$ may be further identified and enumerated. As is shown in FIG. 4A, the various contiguous spaces $A_1$, $A_2 \ldots A_{17}$ along the rear face of the bin 430 are shown. Information regarding the locations of such spaces and their respective areas may be stored in at least one data store. Alternatively, the net visible area of the rear face of the bin 430, or $A_{NET}$, may be further processed in order to remove insignificant or inaccessible portions of the bin 430 from consideration when determining an effective available volume of the bin 430. As is shown in FIG. 4A, an effective net visible area, or $A_{EFF}$ (not labeled), may be calculated based on a product of an effective available height of the bin 430, or $h_{EFF}$, and the width w of the bin 430.

As is shown in FIG. 4B, the various available volumes $V_1$, $V_2 \ldots V_{17}$ within the bin 430 may be determined by multiplying the areas $A_1, A_2 \ldots A_{17}$ of the respective contiguous spaces by a depth d of the bin 430. The locations of such available volumes $V_1, V_2 \ldots V_{17}$ within the bin 430, and the dimensions of such volumes, may be stored in at least one data store, and one or more items having dimensions that may be accommodated within each of such volumes may be assigned thereto for storage of any duration. The eligibility of one or more items to be accommodated within the available volumes $V_1, V_2 \ldots V_{17}$ within the bin 430 may then be determined by comparing one or more dimensions of each of such items to the dimensions of the available volumes $V_1, V_2 \ldots V_{17}$. For example, as is also shown in FIG. 4B, the available volume $V_1$, viz., the largest available volume within the bin 430, may accommodate a book on each of the left and right sides, as well as six laptop computers between the books, above the various items 40. Similarly, the available volume $V_2$, viz., one of the smallest available volumes within the bin 430, may accommodate three ballpoint pens therein. A determination as to whether or how many items may be accommodated within an available volume, such as one or more of the available volumes $V_1, V_2 \ldots V_{17}$, may be based on the various dimensions of the volumes and the items, e.g., heights, lengths, widths or volumes, as well as the number of items requiring storage, or any other relevant factor.

Figure 5:
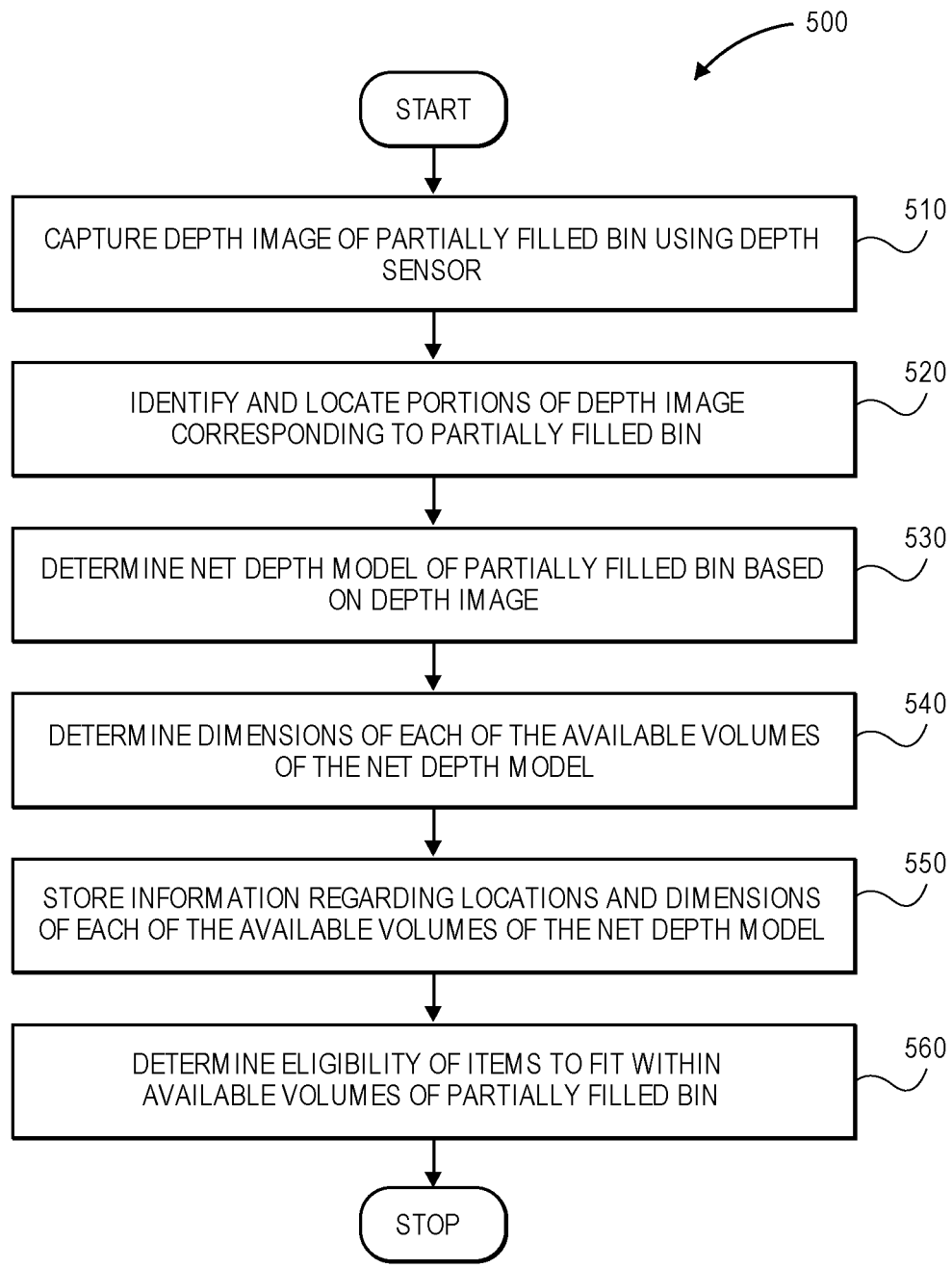
FIG. 5 is a flow chart of a method for estimating available volumes using imaging data, in accordance with embodiments of the present disclosure.

As is discussed above, imaging data including a depth profile or other depth or ranging data may also be used to identify one or more available volumes of a defined space, such as a bin or other storage vessel or facility. Referring to FIG. 5, a flow chart 500 representing one embodiment of a process for estimating available volumes is shown. At box 510, a depth image of a partially filled bin is captured using a depth sensor. For example, referring again to FIG. 1B, an imaging device 160B may obtain imaging data including a depth profile or other data regarding distances from the imaging device 160B to the various portions of the storage facility 130 and the items 10 therein. At box 520, the various portions of the depth image that correspond to the partially filled bin are identified and located. For example, the various voxels of the depth image may be evaluated in order to determine which of said voxels corresponds to the bin, and which of said voxels corresponds to items within the bin, or the various surroundings of the bin, e.g., by determining which of the voxels represents unoccupied portions of the bin, and which of the voxels corresponds to occupied portions of the bin.

At box 530, a net depth model of the partially filled bin is determined based on the depth image, and at box 540, the dimensions of each of the available volumes of the net depth model are determined. The net depth model may include information regarding the dimensions of voxels regarding available volumes within the bin, e.g., the portions of the partially filled bin that are not occupied by objects, e.g., items, and the dimensions of each of such available volumes may be determined by the number or the dimensions of such voxels, or in any other manner.

At box 550, information regarding the locations and dimensions of each of the available volumes within the net depth model is stored in at least one data store, and at box 560, the eligibility of items to fit within each of the available volumes of the partially filled bin defined at box 550 is determined. An item, or a combination of items, having an aggregate volume of not more than one or more of the effective available volumes of the bin may be assigned for storage in the bin. Alternatively, and in addition to volume, other dimensions of the bin or the item or items, e.g., widths, depths or heights of the bin or the item or items, may be compared in order to determine whether the item or items are eligible to fit within the effective available volumes of the bin.

Figure 6A:
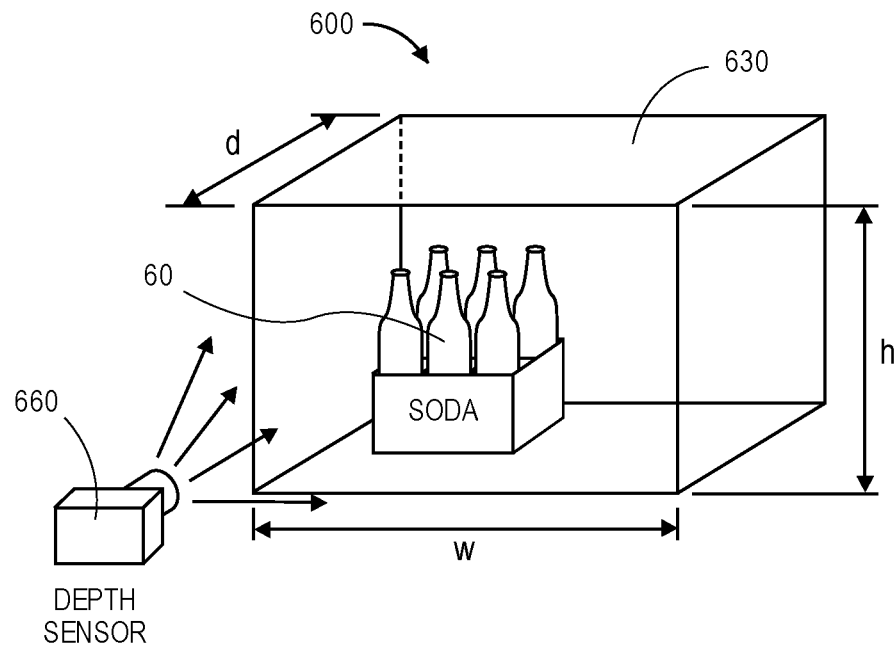
FIGS. 6A and 6B show components of systems for estimating available volumes using imaging data, in accordance with embodiments of the present disclosure.
Figure 6A:
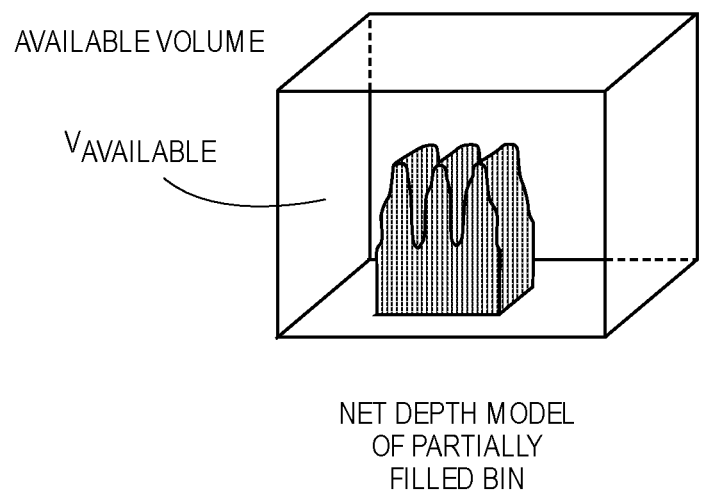
Figure 6B:
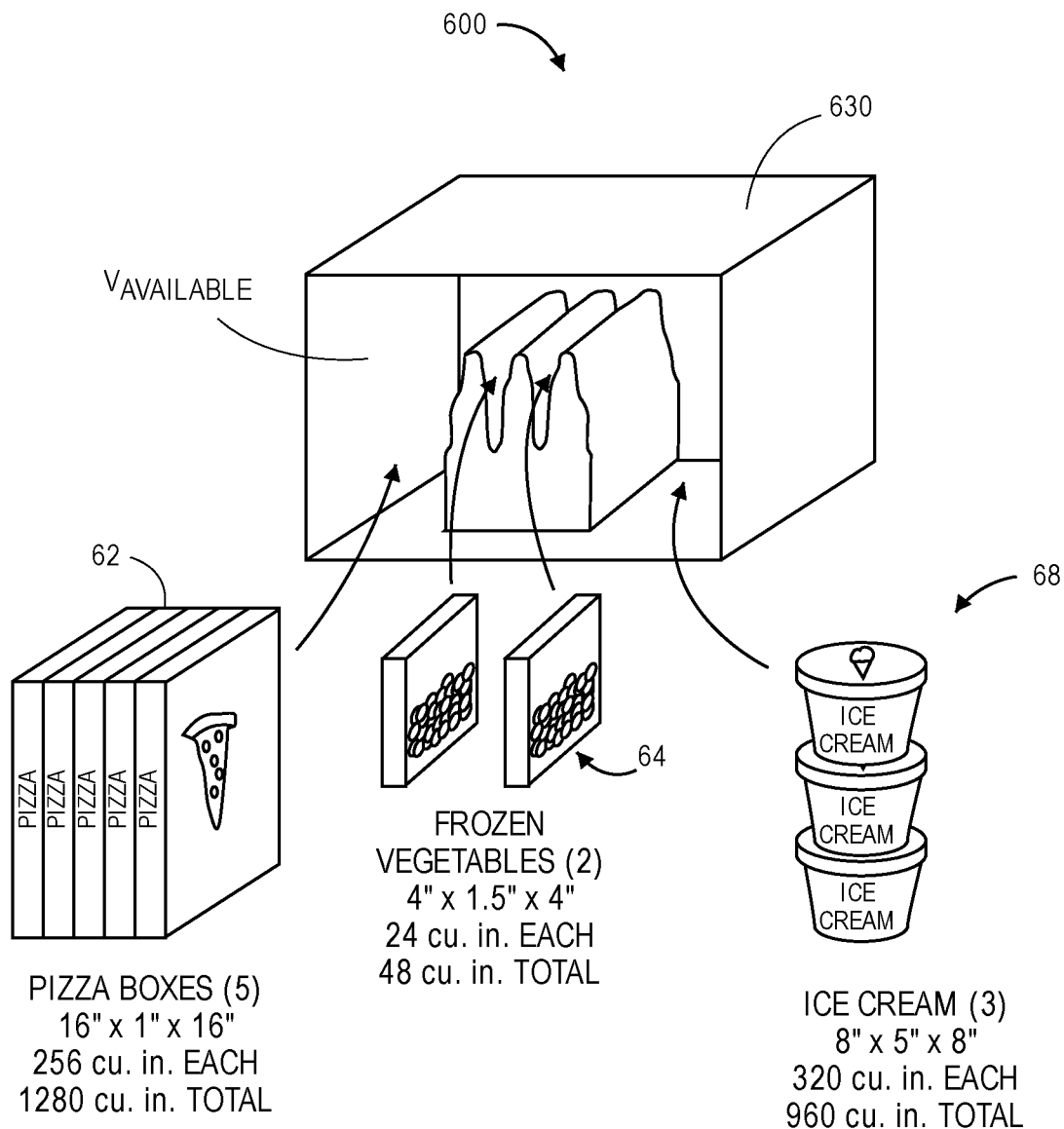

The determination of an effective available volume of a defined space in accordance with the systems and methods of the present disclosure, and the identification of one or more items that may be accommodated within the effective available volume, are shown in FIGS. 6A and 6B. Referring to FIG. 6A, components of systems for estimating available volumes using imaging data are shown. Except where otherwise noted, reference numerals preceded by the number "6" in FIG. 6A or FIG. 6B indicate components or features that are similar to components or features having reference numerals preceded by the number "4" shown in FIG. 4A or FIG. 4B, by the number "2" shown in FIG. 2A or FIG. 2B, or by the number "1" shown in FIG. 1A or FIG. 1B.

As is shown in FIG. 6A, a system 600 including a bin 630 and a depth sensor 660 is shown. The bin 630 has a width w, a height h and a depth d, and contains a plurality of items 60 (viz., a six-pack of bottled soda). In accordance with the systems and methods of the present disclosure, such as the process represented in the flow chart 500 of FIG. 5, a net depth model of the bin 630 may be determined using imaging data obtained from the depth sensor 660. The net depth model may define the distances between the depth sensor 660 and the bin 630, and the plurality of items 60 therein. Additionally, an available volume $V_{AVAILABLE}$ may be identified based on the net depth model, and may further represent an accessible or usable portion of the bin 630 that may be accommodated by additional items.

Once the dimensions of the available volume $V_{AVAILABLE}$ of the bin 630 are estimated, the eligibility of one or more items to be accommodated within the effective available volume $V_{AVAILABLE}$ may be determined. For example, any number of items having known dimensions and volumes that may be accommodated within the available volume $V_{AVAILABLE}$ of the bin 630 may be identified and assigned to the bin 630 for storage. Referring to FIG. 6B, the bin 630 is shown along with additional items 62 (viz., five boxes of pizza), 64 (viz., two boxes of frozen vegetables), 68 (viz., three tubs of ice cream). Upon estimating an effective available volume $V_{AVAILABLE}$ of the bin 630, the systems and methods of the present disclosure may select an item or a combination of items 62, 64, 68 that may be accommodated within aspects of the effective available volume $V_{AVAILABLE}$ of the bin 630. For example, based on the volumes of the individual boxes of pizza, the individual boxes of frozen vegetables and the individual tubs of ice cream, a number of such boxes or tubs that may be accommodated within the bin 630 may be determined, and boxes or bins in such numbers may be assigned to the bin 630 for storage. The pizza boxes 62 may be accommodated on a left side of the bin 630, while the ice cream tubs 68 may be provided on a right side of the bin 630, and the boxes of frozen vegetables 64 may be accommodated in the regions located between the bottles of the six-pack. Although the bin 630 of FIG. 6A comprises a single contiguous available volume, those of ordinary skill in the pertinent arts will recognize that the determination of the dimensions of available volumes of the bin 630 of FIG. 6A, and the assignment of items to the available volumes of the bin 630 of FIG. 6B, may be performed where a bin or other storage facility includes any number of contiguous available volumes in accordance with the present disclosure.

As is discussed above, information regarding the availability of volumes of one or more bins or other storage vessels or facilities may be determined using any type or form of imaging device, including but not limited to imaging devices provided in association with one or more wearable computer systems which may be worn by workers roving or otherwise traveling throughout a fulfillment center environment. The information regarding a bin or other storage vessel or facility may be captured in the form of images, depth profiles or other imaging data, evaluated in order to estimate an available volume of the bin, the vessel or the facility, and stored in association with the bin, the vessel or the facility in at least one data store, along with information regarding available volumes of other bins, vessels or facilities.

Figure 7:
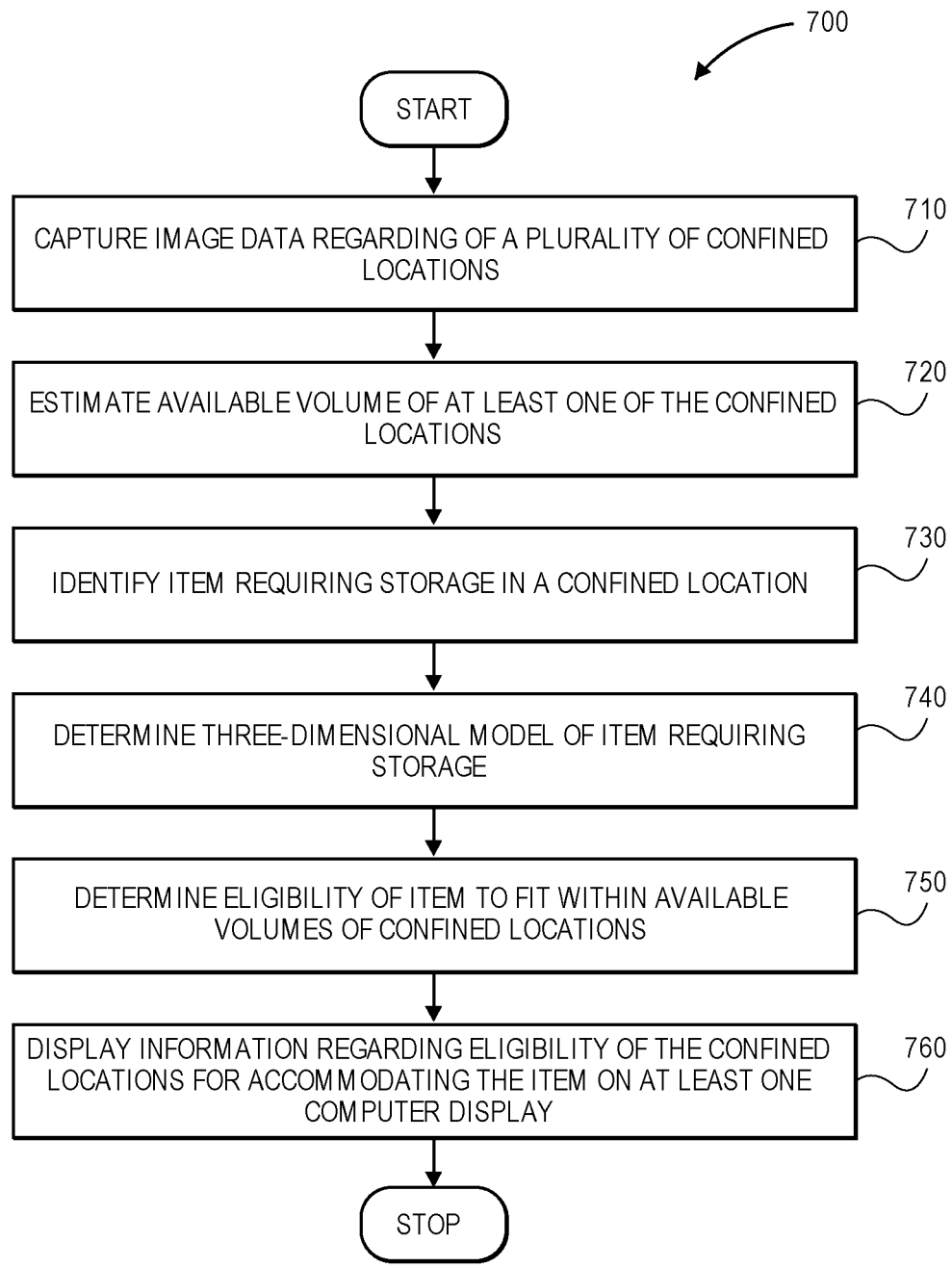
FIG. 7 is a flow chart of a method for estimating available volumes using imaging data, in accordance with embodiments of the present disclosure.

Subsequently, a determination as to whether an item may be accommodated within an available volume of one or more bins or other vessels or facilities may be made based on the numbers and locations of such available volumes, and provided to a worker, such as the worker 240 of FIGS. 2A and 2B, by any means or method in accordance with the present disclosure. Upon receiving information regarding the eligibility of a given item to be accommodated within one or more of such bins, the worker may then be given an instruction as to a location of one of the bins, vessels or facilities, an instruction to store the item there. Referring to FIG. 7, a flow chart 700 representing one embodiment of a process for estimating available volumes is shown. At box 710, image data regarding a plurality of confined locations is captured, e.g., by an imaging device such as a digital camera, a range camera or a depth sensor. For example, the imaging data regarding the plurality of confined locations may be captured from a imaging device that is mounted in a given location within a fulfillment center, or from an imaging device that may move throughout the fulfillment center, e.g., an imaging device associated with a wearable computer device operated by a user, or an imaging device mounted to an autonomous mobile robot.

At box 720, an available volume of at least one of the confined locations is determined. For example, where the image data comprises a digital image of a given confined location, a volume may be estimated by identifying the portions of the image corresponding to a rear face of the given confined location, determining an area of such portions, and multiplying the area by a depth of the given confined location, such as is shown in FIGS. 4A and 4B. The estimated volume of the given confined location, and a position of the given confined location, may be stored in at least one data store. Alternatively, where the image data comprises a depth profile of the given confined location, an available volume of the given confined location may be estimated based on the depth profile, such as is shown in FIGS. 6A and 6B.

At box 730, an item requiring storage in a confined location is identified. For example, the item may have arrived at a fulfillment center in an inbound shipment, and may require storage until an order for the item is received from an electronic marketplace with which the fulfillment center is associated. At box 740, a three-dimensional model of the item requiring storage is determined. The model may define any number of relevant metrics associated with an item, including a width, a depth, a height, a diameter, a mass or a volume.

At box 750, the eligibility of the item to fit within one or more of the available volumes of the various confined locations is determined. For example, the dimensions of one or more of a plurality of items, as determined at box 740, may be compared to the dimensions of the available volumes of confined locations, as estimated at box 720, in order to determine which of the confined locations may accommodate a given item, or to identify which of a plurality of items may be accommodated within a given confined location. At box 760, information regarding the eligibility of one or more of the confined locations for the purpose of accommodating the item is displayed on at least one computer display, and the process ends. For example, information regarding a bin into which an item may be accommodated, i.e., an identifier of the bin, or a location of the bin, may be provided on a desktop computer, a tablet computer, a handheld device or any other type of device that may be operated by a worker.

Figure 8A:
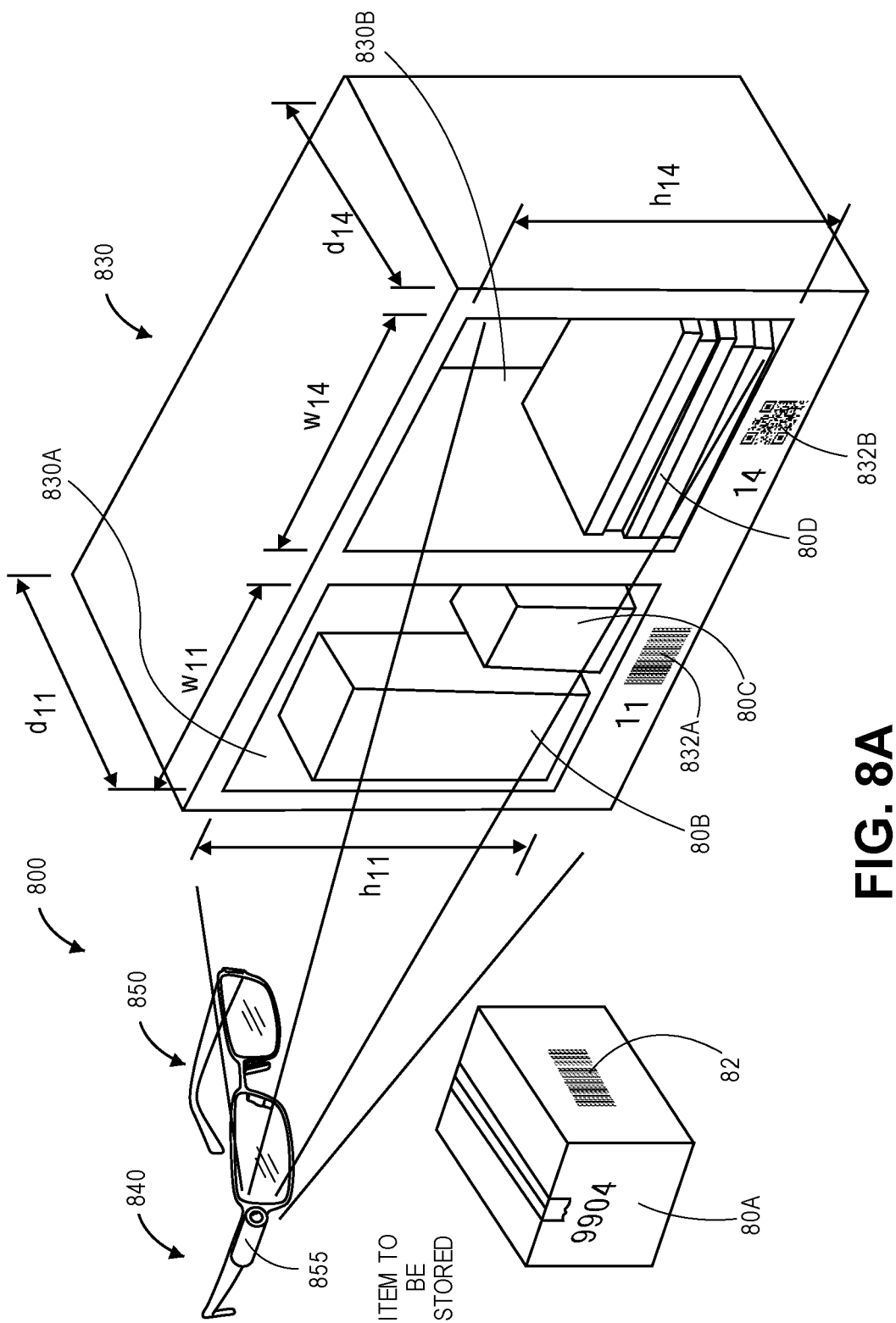
FIGS. 8A and 8B show components of systems for estimating available volumes using imaging data, in accordance with embodiments of the present disclosure.
Figure 8B:
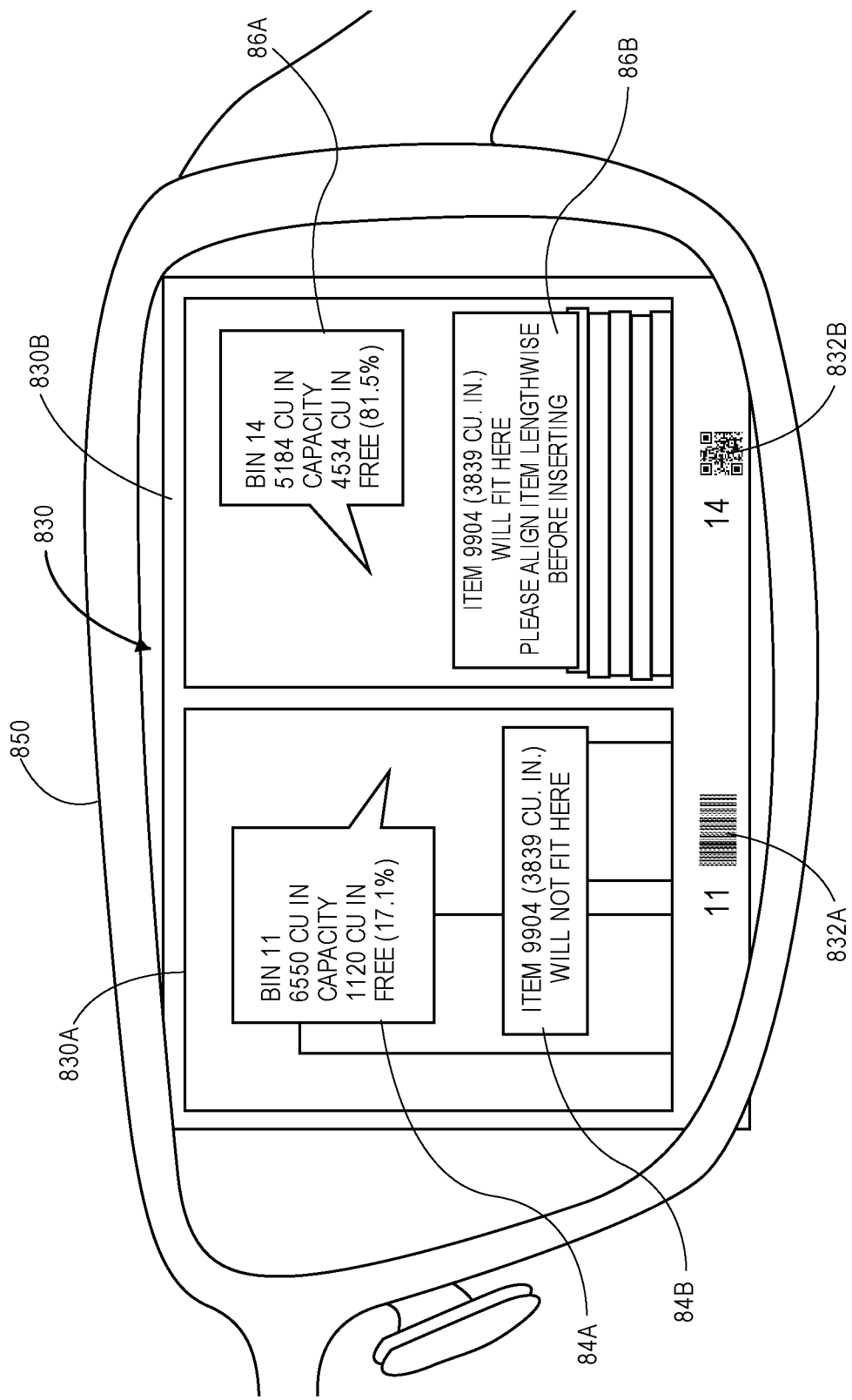

According to some embodiments of the present disclosure, information regarding one or more confined locations may be captured using one or more fixed or mobile sensors, e.g., imaging devices provided on a frame of a wearable computer system, such as a pair of augmented reality glasses. Subsequently, upon identifying an item, the eligibility of the item to fit within one or more of the confined locations may be provided on a computer display, e.g., within a window displayed on an eye-level display of a wearable computer system, such as a pair of augmented reality glasses. Referring to FIGS. 8A and 8B, components of systems for estimating available volumes using imaging data are shown. Except where otherwise noted, reference numerals preceded by the number "8" in FIG. 8A or FIG. 8B indicate components or features that are similar to components or features having reference numerals preceded by the number "6" shown in FIG. 6A or FIG. 6B, by the number "4" shown in FIG. 4A or FIG. 4B, by the number "2" shown in FIG. 2A or FIG. 2B, or by the number "1" shown in FIG. 1A or FIG. 1B.

As is shown in FIG. 8A, a system 800 includes a storage facility 830, a worker 840 and a pair of augmented reality glasses 850. The storage facility 830 includes a pair of bins 830A, 830B. The bin 830A includes a plurality of items 80B, 80C therein. The bin 830B includes a plurality of items 80D therein. The worker 840 is attempting to identify a bin into which the item 80A having a bar code 82 thereon may be stored. The glasses 850 further include an imaging device 855 (e.g., a digital camera, a range camera or a depth sensor).

According to the systems and methods of the present disclosure, the worker 840 may identify the item 80A and the bins 830A, 830B, e.g., by reading one or more alphanumeric characters, bar codes or other marked identifiers, and also capture imaging data regarding the contents of the bins 830A, 830B, using the imaging device 855 of the glasses 850. For example, the imaging device 855 may capture one or more images of the item 80A or either of the bins 830A, 830B and recognize the bar codes 82, 832A, 832B therein. Additionally, the imaging device 855 may capture imaging data regarding the interior portions of the bins 830A, 830B, including but not limited to one or more images or depth profiles, and, based on such imaging data, estimate the available volumes within such bins 830A, 830B. Such imaging data may be captured while the worker is actively performing a task that is directly related to the bins 830A, 830B or, alternatively, passively captured as the bins 830A, 830B pass within a field of view of the imaging device 855 while the worker 840 is performing one or more tasks that are unrelated to the bins 830A, 830B. Based on such imaging data, information regarding the available volumes of the bins 830A, 830B, as well as the locations of the bins 830A, 830B, may be stored in one or more records maintained in at least one data store along with information regarding available volumes and their respective locations.

Once the item 80A is identified, and available volumes of the bins 830A, 830B or any number of other storage vessels or facilities are determined, the dimensions of the item 80A may be compared to the dimensions of such available volumes (e.g., of the bins 830A, 830B or of any other storage vessels or facilities), in order to determine which of the bins 830A, 830B may accommodate the item 80A. Information regarding the eligibility of the item 80A to be accommodated within a bin, a storage vessel or another facility, including but not limited to either of the bins 830A, 830B may be provided to the worker 840 in any manner, such as by rendering such information in an eye-level display provided on the glasses 850.

Referring to FIG. 8B, the bins 830A, 830B are shown within a field of view of the glasses 850. As is shown in FIG. 8B, windows 84A, 86A including information regarding the available volumes within such bins 830A, 830B (e.g., the total capacities of the bins and the available portions of the bins) and windows 84B, 86B indicating whether the item 80A will fit, or will not fit, within the bins 830A, 830B are shown. In particular, the window 84B indicates that the item 80A will not fit within the bin 830A, while the window 86B indicates that the item 80A will fit within the bin 830B, and includes instructions for inserting the item 80A into the bin 830B.

Thus, in accordance with the systems and methods of the present disclosure, a worker 840 may capture imaging data regarding a plurality of bins, storage vessels or other facilities, such as the bins 830A, 830B, using an imaging device, such as the imaging device 855 of the glasses 850, and estimate available volumes of such bins, vessels or facilities based on the imaging data. Information regarding the bins, the vessels or the facilities, including but not limited to the available volumes and locations of such bins, vessels or facilities, may be stored in one or more records maintained in at least one data store. Subsequently, when an item such as the item 80A requires accommodation in a bin, a storage vessel or a facility, the item may be identified, and the dimensions of the item may be determined. The identity and the dimensions of the item may then be compared to the dimensions of the available volumes. Subsequently, a specific available volume that may accommodate the item may be selected on any basis, and information regarding the specific available volume, including but not limited to a location of a bin, a storage vessel or a facility in which the available volume is located, may be provided to the worker 840 in a convenient and readily understood manner.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent art will recognize that the utility of the systems and methods disclosed herein is not limited to fulfillment center environments, and may be used in any environment in which an estimated available volume of a defined space, or information regarding the suitability of the defined space for accommodating an item, is desired. Thus, the systems and methods disclosed herein may be provided for the purpose of determining shelving capacity in a library or department store, or freezer capacity within a grocery store, or in any other relevant situation. Additionally, those of ordinary skill in the pertinent arts will recognize that the systems and methods of the present disclosure are not limited to the estimation of available volumes of rectangular hollows, such as the storage facility 130 of FIGS. 1A and 1B. Rather, through one or more single-variable or multivariable analytical processes and commonly accepted trigonometric functions, the available volumes of storage facilities having shapes in the form of spheres, pyramids, cones, cylinders, or any other shapes, may be determined in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5 and 7, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   capturing at least a first image of a storage facility by a wearable imaging device worn by a user, wherein the storage facility comprises a plurality of storage vessels;
   recognizing at least one visible portion of a rear face of a first storage vessel in the first image by at least one processor, wherein the first storage vessel is one of the plurality of storage vessels;
   determining a depth of the first storage vessel by the at least one processor;
   estimating an area of the at least one visible portion of the rear face of the first storage vessel by the at least one processor;
   estimating an available volume of the first storage vessel based at least in part on the area of the at least one visible portion of the rear face of the first storage vessel and the depth of the first storage vessel by the at least one processor; and
   causing a display of information regarding the estimated available volume on at least one wearable display device worn by the user.

2. The method of claim 1, further comprising:
   recognizing at least one of a plurality of bar codes provided on at least one surface of the storage facility in the first image by the at least one processor, wherein each of the bar codes is associated with one of the storage vessels;
   interpreting at least some of the plurality of bar codes by the at least one processor; and
   in response to interpreting at least some of the plurality of bar codes,
   selecting one of the storage vessels by the at least one computer processor,
   wherein the first storage vessel is the selected one of the storage vessels.

3. The method of claim 1, further comprising:
   determining an available capacity of the first storage vessel based at least in part on the estimated available volume by the at least one computer processor,
   wherein the information regarding the estimated available volume comprises at least one of:
   a first indication of an available capacity of the first storage vessel; or
   a second indication of the available capacity of the first storage vessel as at least one of a fraction, a ratio or a percentage of a total capacity of the first storage vessel.

4. The method of claim 1, further comprising:
   capturing at least a second image of a portion of an item by the wearable imaging device;
   recognizing a bar code on an external surface of the item by the at least one computer processor;
   determining at least of a length, a width, a depth or a volume of the item based at least in part on the recognized bar code by the at least one computer processor; and
   determining whether the item may be accommodated in the first storage vessel based at least in part on the estimated available volume and the at least one of the length, the width, the depth or the volume of the item by the at least one computer processor,
   wherein the information regarding the estimated available volume comprises at least one of:
   a first indication that the item may be accommodated in the estimated available volume of the first storage vessel; or
   a second indication that the item may not be accommodated in the estimated available volume of the first storage vessel.

5. The method of claim 1, wherein estimating the area of the at least one visible portion of the rear face of the first storage vessel comprises:
   determining an effective height of the at least one visible portion of the rear face of the first storage vessel based at least in part on the first image by the at least one processor;
   determining a width of the at least one visible portion of the rear face of the first storage vessel based at least in part on the first image by the at least one processor,
   wherein the effective area excludes at least some of the at least one visible portion of the image corresponding to the rear face of the storage vessel,
   wherein estimating the available volume of the storage vessel comprises:
   calculating a product of the effective height, the width and the depth by the at least one processor.

6. A method comprising:
   capturing, by a wearable imaging device, a first image of at least a portion of a defined space;
   recognizing, by at least one computer processor, a portion of the first image corresponding to a rear face of the defined space;
   identifying, by the at least one computer processor, a depth of the defined space;
   estimating, by the at least one computer processor, an available volume of the defined space based at least in part on the portion of the first image corresponding to the rear face of the defined space and the depth of the defined space; and causing, by the at least one computer processor, a display of information regarding the estimated available volume of the defined space on a wearable eye-level display.

7. The method of claim 6, further comprising:
estimating, by the at least one computer processor, at least one of an effective height or an effective width of the rear face of the defined space based at least in part on the portion of the first image corresponding to the rear face of the defined space; and calculating, by the at least one computer processor, an effective area of the rear face of the defined space based at least in part on at least one of the effective height or the effective width, wherein estimating the available volume of the defined space comprises:

multiplying the effective area of the rear face of the defined space by the depth of the defined space.

8. The method of claim 6, wherein recognizing the portion of the first image corresponding to the rear face of the defined space comprises:

determining, by the at least one computer processor, a color of the rear face; and analyzing, by the at least one computer processor, the first image to identify pixels having the color of the rear face within the first image, wherein the portion of the first image corresponding to the rear face of the defined space is recognized based at least in part on the pixels having the color of the rear face within the first image.

9. The method of claim 6, wherein estimating the available volume of the defined space comprises:

extrapolating the portion of the first image corresponding to the rear face of the defined space based at least in part on the depth of the defined space.

10. The method of claim 6, wherein recognizing the portion of the first image corresponding to the rear face of the defined space comprises:

determining a number of pixels within the first image corresponding to the rear face of the defined space; and determining a pixel size of at least one of the pixels within the first image corresponding to the rear face of the defined space, and wherein estimating the available volume of the defined space based at least in part on the portion of the first image corresponding to the rear face of the defined space and the depth of the defined space comprises:

estimating an area of the rear face of the defined space based at least in part on the number of pixels and the pixel size; and multiplying the estimated area of the rear face of the defined space by the depth of the defined space.

11. The method of claim 6, further comprising:
determining, by the at least one computer processor, a volume of the defined space; and calculating, by the at least one computer processor, at least one of a fraction, a ratio or a percentage of the estimated available volume of the defined space to the volume of the defined space, wherein the information regarding the estimated available volume comprises the at least one of the fraction, the ratio or the percentage.

12. The method of claim 6, further comprising:
identifying, by the at least one computer processor, information regarding a plurality of items in at least one data store, wherein the information regarding the plurality of items comprises an identifier and at least one dimension for each of the plurality of items;

determining, by the at least one computer processor, that at least one of the plurality of items may be accommodated within the estimated available volume of the defined space; and causing, by the at least one computer processor, a display of information regarding the at least one of the plurality of items that may be accommodated within the estimated available volume of the defined space on the wearable eye-level display.

13. The method of claim 6, further comprising:
capturing, by the wearable imaging device, a second image of at least a portion of an item;

recognizing, by the at least one computer processor, a portion of the second image corresponding to a bar code associated with the item;

interpreting, by the at least one computer processor, the bar code;

determining, by the at least one computer processor, at least one dimension of the item based at least in part on the interpreted bar code;

determined, by the at least one computer processor, whether the item may be accommodated in the estimated available volume of the defined space based at least in part on the at least one dimension of the item; and causing, by the at least one computer processor, a display of information regarding the item on the wearable eye-level display, wherein the information regarding the item comprises at least one of:

a first indication that the item may be accommodated within the estimated available volume of the defined space; or a second indication that the item may not be accommodated within the estimated available volume of the defined space.

14. The method of claim 6, wherein the portion of the first image corresponding to the rear face of the defined space comprises a plurality of contiguous spaces, and wherein estimating the available volume of the defined space comprises:

determining, by the at least one computer processor, an area associated with at least one of the plurality of contiguous spaces based at least in part on the first image;

determining, by the at least one computer processor, an available volume corresponding to the at least one of the plurality of contiguous spaces, wherein determining the available volume corresponding to the at least one of the plurality of contiguous spaces comprises multiplying the area associated with the at least one of the plurality of contiguous spaces by the depth of the defined space; and storing information regarding the available volume of the at least one of the plurality of contiguous spaces in at least one data store.

15. The method of claim 6, wherein identifying the depth of the defined space comprises:

recognizing, by the at least one computer processor, a portion of the first image corresponding to a bar code associated with the defined space;

interpreting, by the at least one computer processor, the bar code; and determining, by the at least one computer processor, the depth of the defined space based at least in part on the interpreted bar code.

16. A wearable computer system comprising:
an imaging device mounted to a frame;
an eye-level display device mounted to the frame; and
a computing device in communication with the imaging device and the display device,
wherein the computing device is configured to at least:
capture imaging data using the imaging device;
determine that the imaging data depicts at least a portion of a defined space;
determine an identifier of the defined space based at least in part on the imaging data;
identify at least a depth of an interior of the defined space based at least in part on the identifier of the defined space;
estimate a visible area of a rear face of the interior of the defined space based at least in part on the imaging data;
estimate an available volume of the interior of the defined space based at least in part on the depth and the estimated visible area of the interior of the defined space; and
store information regarding the estimated available volume of the interior of the defined space in association with the marked identifier of the defined space in at least one data store.

17. The wearable computer system of claim 16, wherein the computing device is further configured to at least:
cause a display of a first window by the eye-level display device, wherein the first window comprises at least one of:
the identifier of the defined space;
a measure of the estimated available volume of the interior of the defined space; or
a maximum capacity of the interior of the defined space.

18. The wearable computer system of claim 17, wherein the computing device is further configured to at least:
receive information regarding an item over a network;
determine at least one dimension of the item based at least in part on the information;
determine whether the item may be accommodated within the interior of the defined space based at least in part on the at least one dimension of the item and the estimated available volume of the interior of the defined space; and
cause a display of a second window by the eye-level display device,
wherein the second window comprises an identifier of the item and at least one of:
a first indication that the item may be accommodated within the interior of the defined space; or
a second indication that the item may not be accommodated within the interior of the defined space.

19. The wearable computer system of claim 17, wherein the computing device is further configured to at least:
determine an instruction for inserting the item into the interior of the defined space,
wherein the second window comprises the first indication that the item may be accommodated within the interior of the defined space and the instruction for inserting the item into the interior of the defined space.

20. The wearable computer system of claim 16, wherein the computing device is further configured to at least:
identify pixels of the imaging data corresponding to the rear face of the interior of the defined space; and
extrapolate the pixels of the imaging data corresponding to the rear face of the interior of the defined space based at least in part on the depth of the interior of the defined space,
wherein the visible area of the rear face of the interior of the defined space is estimated based at least in part on the extrapolated pixels.

* * * * *